US012750646B2

(12) United States Patent
Quinquis et al.

(10) Patent No.: US 12,750,646 B2
(45) Date of Patent: Sep. 29, 2026

(54) METHODS, ARCHITECTURES, APPARATUSES AND SYSTEMS FOR AI/ML MODEL DISTRIBUTION

(71) Applicant: InterDigital CE Patent Holdings, SAS, Paris (FR)

(72) Inventors: Cyril Quinquis, Melesse (FR); Thierry Filoche, Chateaugiron (FR); Stephane Onno, Saint Gregoire (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 163 days.

(21) Appl. No.: 18/681,403

(22) PCT Filed: Jul. 29, 2022

(86) PCT No.: PCT/EP2022/071452

§ 371 (c)(1),
(2) Date: Feb. 5, 2024

(87) PCT Pub. No.: WO2023/012074

PCT Pub. Date: Feb. 9, 2023

(65) Prior Publication Data

US 2024/0357332 A1 Oct. 24, 2024

(30) Foreign Application Priority Data

Aug. 5, 2021 (EP) .................................... 21306093

(51) Int. Cl.
*H04W 8/00* (2009.01)
*G06F 15/16* (2006.01)
(Continued)

(52) U.S. Cl.
CPC ............. *H04W 4/60* (2018.02); *H04W 8/005* (2013.01)

(58) Field of Classification Search
CPC ......... H04W 4/60; H04W 8/005; H04W 4/02; H04W 72/04; H04W 36/00; H04W 8/18; G06N 20/00; H04L 29/06; G06F 15/16
See application file for complete search history.

(56) References Cited

U.S. PATENT DOCUMENTS

2008/0005336 A1* 1/2008 Cohen ................. H04L 67/1085 709/227
2015/0193695 A1* 7/2015 Cruz Mota ............ G06N 20/00 706/12

(Continued)

FOREIGN PATENT DOCUMENTS

WO WO2011087469 A1 7/2011
WO WO 2021029797 A1 2/2021

(Continued)

OTHER PUBLICATIONS

"3rd Generation Partnership Project (3GPP); Technical Specification Group Services and System Aspects; Study on architecture enhancements for EPS and 5G System to support advanced V2X services (Release 16)", 3GPP TR 23.786 V0.8.0, Aug. 2018, 83 pages.

(Continued)

*Primary Examiner* — Chris Parry
*Assistant Examiner* — Hassan Abdur-Rahman Khan
(74) *Attorney, Agent, or Firm* — Mark D. Pratt

(57) ABSTRACT

Procedures, methods, architectures, apparatuses, systems, devices, and computer program products comprising: sending, by a first Wireless Transmit/Receive Unit (WTRU) to a network entity, a subscription request for downloading an AI/ML model, the AI/ML model comprising a first model portion, and one or more further model portions; determining a second WTRU storing at least the first model portion of the AI/ML model; sending, to the network entity, first information comprising an indication of the second WTRU; receiving, from the network entity, second information indicating a schedule for downloading at least the first model portion of the AI/ML model from the second WTRU; and downloading, from the second WTRU via a device-to-device communication between the first WTRU and the (Continued)

second WTRU, at least the first model portion of the AI/ML model at a scheduled time using the second information.

19 Claims, 42 Drawing Sheets

(51) Int. Cl.

| | |
|---|---|
| ***G06N 20/00*** | (2019.01) |
| ***H04L 29/06*** | (2006.01) |
| ***H04W 4/02*** | (2018.01) |
| ***H04W 4/60*** | (2018.01) |
| ***H04W 8/18*** | (2009.01) |
| ***H04W 36/00*** | (2009.01) |
| ***H04W 72/04*** | (2023.01) |

(56) References Cited

U.S. PATENT DOCUMENTS

| | | | | |
|---|---|---|---|---|
| 2018/0067779 | A1* | 3/2018 | Pillalamarri | H04L 41/046 |
| 2019/0138934 | A1* | 5/2019 | Prakash | G06N 20/00 |
| 2019/0156247 | A1* | 5/2019 | Faulhaber, Jr. | G06N 3/08 |
| 2020/0050951 | A1* | 2/2020 | Wang | G06N 20/00 |
| 2020/0311559 | A1* | 10/2020 | Chattopadhyay | G06N 5/01 |
| 2021/0127245 | A1* | 4/2021 | Park | H04W 4/80 |
| 2021/0342747 | A1* | 11/2021 | Feng | H04L 41/16 |
| 2022/0171995 | A1* | 6/2022 | Balasubramanian | G06N 20/00 |
| 2022/0237507 | A1* | 7/2022 | Bai | H04W 72/21 |
| 2022/0245528 | A1* | 8/2022 | Behera | H04L 9/0894 |
| 2024/0187127 | A1* | 6/2024 | Narayanan Thangaraj | H04L 5/0055 |

FOREIGN PATENT DOCUMENTS

| | | |
|---|---|---|
| WO | WO 2022033804 A1 | 2/2022 |
| WO | WO 2022223499 A1 | 10/2022 |

OTHER PUBLICATIONS

"3rd Generation Partnership Project; Technical Specification Group Services and System Aspects, System Architecture for the 5G System (5GS); Stage 2, (Release 17)", 3GPP TS 23.501 V17.1.1, Jun. 2021, 526 pages.

"3rd Generation Partnership Project; Technical Specification Group Services and System Aspects; Architecture enhancements for 5G System (5GS) to support network data analytics services (Release 17)", 3GPP TS 23.288 V17.1.0, Jun. 2021, 192 pages.

"3rd Generation Partnership Project (3GPP); Technical Specification Group Services and System Aspects; Enhancement of 3GPP Support for V2X Scenarios; Stage 1 (Release 15)", 3GPP TS 22.186 V15.2.0, Sep. 2017, 16 pages.

Yoon et al., "Collaborative Streaming-based Media Content Sharing in WiFi-enabled Home Networks", Institute of Electronics and Electrical Engineers (IEEE), IEEE Transactions on Consumer Electronics, vol. 56, Issue: 4, Nov. 2010, 8 pages.

"3rd Generation Partnership Project (3GPP); Technical Specification Group Radio Access Network; Evolved Universal Terrestrial Radio Access (E-UTRA); Physical layer procedures (Release 14)", 3GPP TS 36.213 V14.4.0, Sep. 2017, 461 pages.

"3rd Generation Partnership Project (3GPP); Technical Specification Group Services and System Aspects; Proximity- based services (ProSe); Stage 2 (Release 15)", 3GPP TS 23.303 V15.1.0, Jun. 2018, 130 pages.

"3rd Generation Partnership Project; Technical Specification Group Services and System Aspects; Study on traffic characteristics and performance requirements for AI/ML model transfer in 5GS (Release 18)", 3GPP TR 22.874 V1.1.0, May 2021, 78 pages.

"3rd Generation Partnership Project (3GPP); Technical Specification Group Services and System Aspects; Study on enhancement of 3GPP Support for 5G V2X Services (Release 15)", 3GPP TR 22.886 V15.1.0, Mar. 2017, 61 pages.

Interdigital, "FS_AMMT—New use-case on local AL/ML model split on factory robots", S1-210024, 3GPP TSG-SA WG1 Meeting #93-e, Electronic Meeting, Feb. 22-Mar. 4, 2021, 9 pages.

* cited by examiner

| Chunk ID | 0 | 1 | 2 | 3 | 4 | 5 |
|---|---|---|---|---|---|---|
| Availability | 3 | 4 | 2 | 1 | 2 | 2 |
| Scarcity | 1/3 | 1/4 | 1/2 | 1 | 1/2 | 1/2 |
| Normalization | 0,10 | 0 | 0,33 | 1 | 0,33 | 0,33 |
| Sum to 1 | 0,04 | 0 | 0,15 | 0,47 | 0,15 | 0,15 |

$y_i$ = Inverse(x)

$y_i = (x_i - \min(x)) / (\max(x) - \min(x))$ $y_i = x_i / \Sigma\, x_i$

FIG. 14

| Chunk ID | 0 | 1 | 2 | 3 | 4 | 5 |
|---|---|---|---|---|---|---|
| Availability | 4 | 1 | 6 | 7 | 5 | 4 |
| Weight | 4/7 | 1/7 | 6/7 | 7/7 | 5/7 | 4/7 |

FIG. 15

| Chunk ID | 0 | 1 | 2 | 3 | 4 | 5 |
|---|---|---|---|---|---|---|
| Basis | 0,9 | 0,09 | 0,09 | 0,09 | 0,09 | 0,09 |
| Sum to 1 | 0,66 | 0,06 | 0,06 | 0,06 | 0,06 | 0,06 |

$y_i = x_i/\Sigma\, x_i$

FIG. 16

| Chunk ID | 0 | 1 | 2 | 3 | 4 | 5 |
|---|---|---|---|---|---|---|
| Weight | 0.3 | 0.25 | 0.15 | 0.15 | 0.1 | 0.05 |

FIG. 17

| Local D2D Server | A | F | H | G |
|---|---|---|---|---|
| Distance | 4m | 5,5m | 10m | 12m |
| Proximity | 1/4 | 1/5,5 | 1/10 | 1/12 |
| Sum to 1 | 0,40 | 0,29 | 0,16 | 0,13 |

$y_i$ = Inverse(x)

$y_i = x_i/\Sigma\, x_i$

FIG. 18

| Local D2D | A | F | H | G |
|---|---|---|---|---|
| Throughput | 15,6Mbps | 3,2Mbps | 0,8Mbps | 0,8Mbps |
| Normalization | 1 | 0,16 | 0 | 0 |
| Sum to 1 | 0,86 | 0,14 | 0 | 0 |

Throughput → Normalization: $y_i = (x_i\text{-min}(x))/(\max(x)\text{-min}(x))$

Normalization → Sum to 1: $y_i = x_i/\Sigma\, x_i$

FIG. 21

Chunk IDs

| Chunk Criteria | 0 | 1 | 2 | 3 | 4 | 5 |
|---|---|---|---|---|---|---|
| Chunk Scarcity | 0,04 | 0 | 0,15 | 0,47 | 0,15 | 0,15 |
| Entry Chunk | 0,66 | 0,06 | 0,06 | 0,06 | 0,06 | 0,06 |
| Chunk Ordering | 0,3 | 0,25 | 0,15 | 0,15 | 0,01 | 0,05 |

FIG. 22

Local D2D Server

Server Criteria

| | A | F | H | G |
|---|---|---|---|---|
| Throughput | 0,86 | 0,14 | 0 | 0 |
| Distance | 0,40 | 0,29 | 0,16 | 0,13 |

FIG. 24

Chunk ID

Local D2D Server

| | 0 | 1 | 2 | 3 | 4 | 5 |
|---|---|---|---|---|---|---|
| UE_A | 1 | 1 | 1 | 0 | 0 | 0 |
| UE_F | 1 | 1 | 0 | 0 | 1 | 0 |
| UE_H | 0 | 1 | 1 | 1 | 1 | 1 |
| UE_G | 1 | 1 | 0 | 0 | 0 | 0 |

FIG. 26

| | | | | | |
|---|---|---|---|---|---|
| 0,35 | 0,07 | 0,11 | 0 | 0 | 0 |
| 0,35 | 0,07 | 0 | 0 | 0,10 | 0 |
| 0 | 0,07 | 0,11 | 0,25 | 0,10 | 0,09 |
| 0,35 | 0,07 | 0 | 0 | 0 | 0 |

×

| |
|---|
| 0,68 |
| 0,20 |
| 0,06 |
| 0,05 |

=

| | | | | | |
|---|---|---|---|---|---|
| 0,23 | 0,04 | 0,07 | 0 | 0 | 0 |
| 0,07 | 0,01 | 0 | 0 | 0,02 | 0 |
| 0 | 0,004 | 0,03 | 0,01 | 0,006 | 0,005 |
| 0,01 | 0,003 | 0 | 0 | 0 | 0 |

$y_i = x_i/\Sigma x_i$

| | | | | | |
|---|---|---|---|---|---|
| 0,45 | 0,07 | 0,13 | 0 | 0 | 0 |
| 0,13 | 0,019 | 0 | 0 | 0,039 | 0 |
| 0 | 0,007 | 0,05 | 0,01 | 0,011 | 0,009 |
| 0,019 | 0,005 | 0 | 0 | 0 | 0 |

Final Weights

FIG. 28

Local D2D Server

| Chunk IDs | 0 | 1 | 2 | 3 | 4 | 5 |
|---|---|---|---|---|---|---|
| UE_A | 0,45 | 0,07 | 0,13 | 0 | 0 | 0 |
| UE_F | 0,13 | 0,019 | 0 | 0 | 0,039 | 0 |
| UE_H | 0 | 0,007 | 0,05 | 0,01 | 0,011 | 0,009 |
| UE_G | 0,019 | 0,005 | 0 | 0 | 0 | 0 |

Best Pairs (UE_A, Chunk ID 0)
(UE_A, Chunk ID 2)
(UE_A, Chunk ID 1)
(UE_F, Chunk ID 4)
(UE_H, Chunk ID 3)
(UE_G, Chunk ID 5)

METHODS, ARCHITECTURES, APPARATUSES AND SYSTEMS FOR AI/ML MODEL DISTRIBUTION

CROSS REFERENCE TO RELATED APPLICATIONS

This application is a U.S. National Stage Application under 35 U.S.C. § 371 of International Patent Application No. PCT/EP2022/071452, filed Jul. 29, 2022, which is incorporated herein by reference in its entirety.

This application claims priority to European Application No. 21306093.2, filed Aug. 5, 2021, which is incorporated herein by reference in its entirety.

FIELD

The present disclosure is generally directed to the fields of communications, software and encoding, including, for example, to methods, architectures, apparatuses, systems directed to distribution of AI/ML (Artificial Intelligence/Machine Learning) models.

BACKGROUND

The AI/ML techniques can be used in various domains, such as image enhancement, audio noise reduction, automatic translation, and navigation. This new intelligence can be accomplished by processing and interpreting precisely and quickly the tremendous amount of data generated by the sensors embedded in the devices, e.g., camera, microphone, thermometer. These sensors aim at reflecting what happens in the close vicinity of the device. Thus, environment change will impact the final application and the user experience.

SUMMARY

According to an embodiment, a method is presented, comprising: sending, by a Wireless Transmit/Receive Unit (WTRU), a subscription request to a Device to Device (D2D) service manager for downloading an AI/ML model, the AI/ML model including a base AI/ML model, as a first model portion and one or more further model portions; determining, by the WTRU, a local D2D server storing at least the first model portion of the AI/ML model; sending, by the WTRU to a network entity, server information indicating the determined local D2D server; receiving, by the WTRU from the network entity, download information indicating: (1) the local D2D server, (2) a portion ID, and (3) a schedule for downloading at least the first model portion of the AI/ML model; and downloading, by the WTRU from the local D2D server via D2D communication, at least the first model portion of the AI/ML model at a scheduled time using the received download information.

Further embodiments include systems configured to perform the methods described herein. Such systems may include a processor and a non-transitory computer storage medium storing instructions that are operative, when executed on the processor, to perform the methods described herein.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGs.) and the detailed description are not to be considered limiting, and other equally effective examples are possible and likely. Furthermore, like reference numerals ("ref.") in the FIGs. indicate like elements, and wherein:

FIG. 14 illustrates an example of weights calculation based on the chunk availability, according to an embodiment;

FIG. 15 illustrates another example of weights calculation based on the chunk availability, according to an embodiment;

FIG. 16 illustrates an example of weights calculation, according to an embodiment;

FIG. 17 illustrates an example of weights calculation based on the chunk order, according to an embodiment;

FIG. 18 illustrates an example of weights calculation based on the distances between a client WTRU (e.g. UE) and the local D2D servers, according to an embodiment;

FIG. 21 illustrates an example of weights calculation based on the throughput between a client WTRU (e.g. UE) and the local D2D servers, according to an embodiment;

FIG. 22 illustrates an example of weights compilation based on chunk criteria type, according to an embodiment;

FIG. 24 illustrates an example of weights compilation based on local D2D server criteria, according to an embodiment;

FIG. 26 illustrates an example of a chunk presence matrix, according to an embodiment;

FIG. 28 illustrates an example of weights calculation based on local D2D server criteria, according to an embodiment;

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-ID, where various elements of the network may utilize, perform, be arranged in accordance with and/or be adapted and/or configured for the methods, apparatuses and systems provided herein.

Figure 1A:
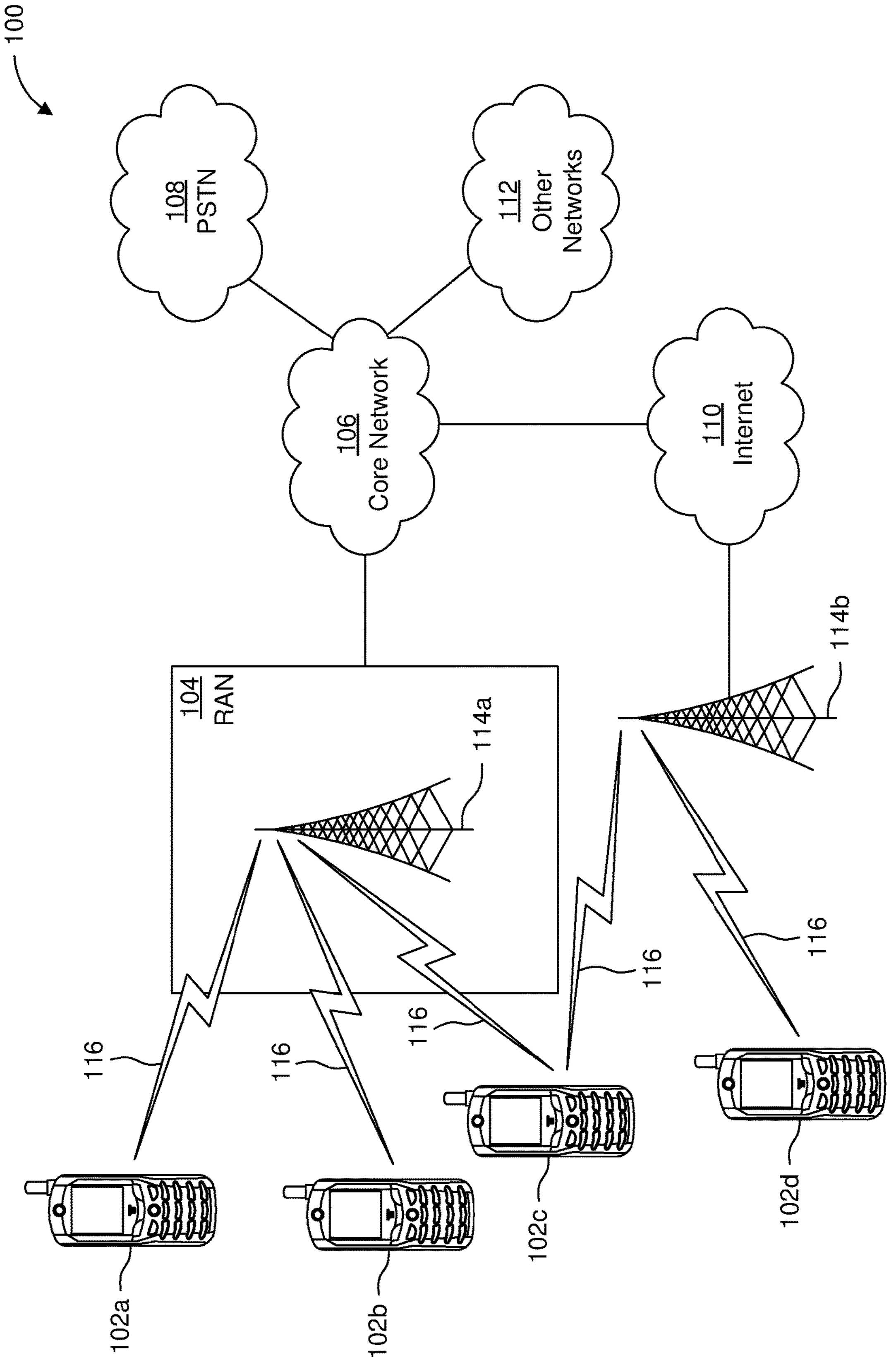
FIG. 1A is a system diagram illustrating an example communications system.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a WTRU 102 (e.g. UE).

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d*, e.g., to facilitate access to one or more communication networks, such as the CN 106/115, the Internet 110, and/or the networks 112. By way of example, the base stations 114*a*, 114*b* may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in an embodiment, the base station 114*a* may include three transceivers, i.e., one for each sector of the cell. In an embodiment, the base station 114*a* may employ multiple-input multiple output (MIMO) technology and may utilize multiple transceivers for each or any sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In an embodiment, the base station 114*a* and the WTRUs 102*a*, 102*b*, 102*c* may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In an embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
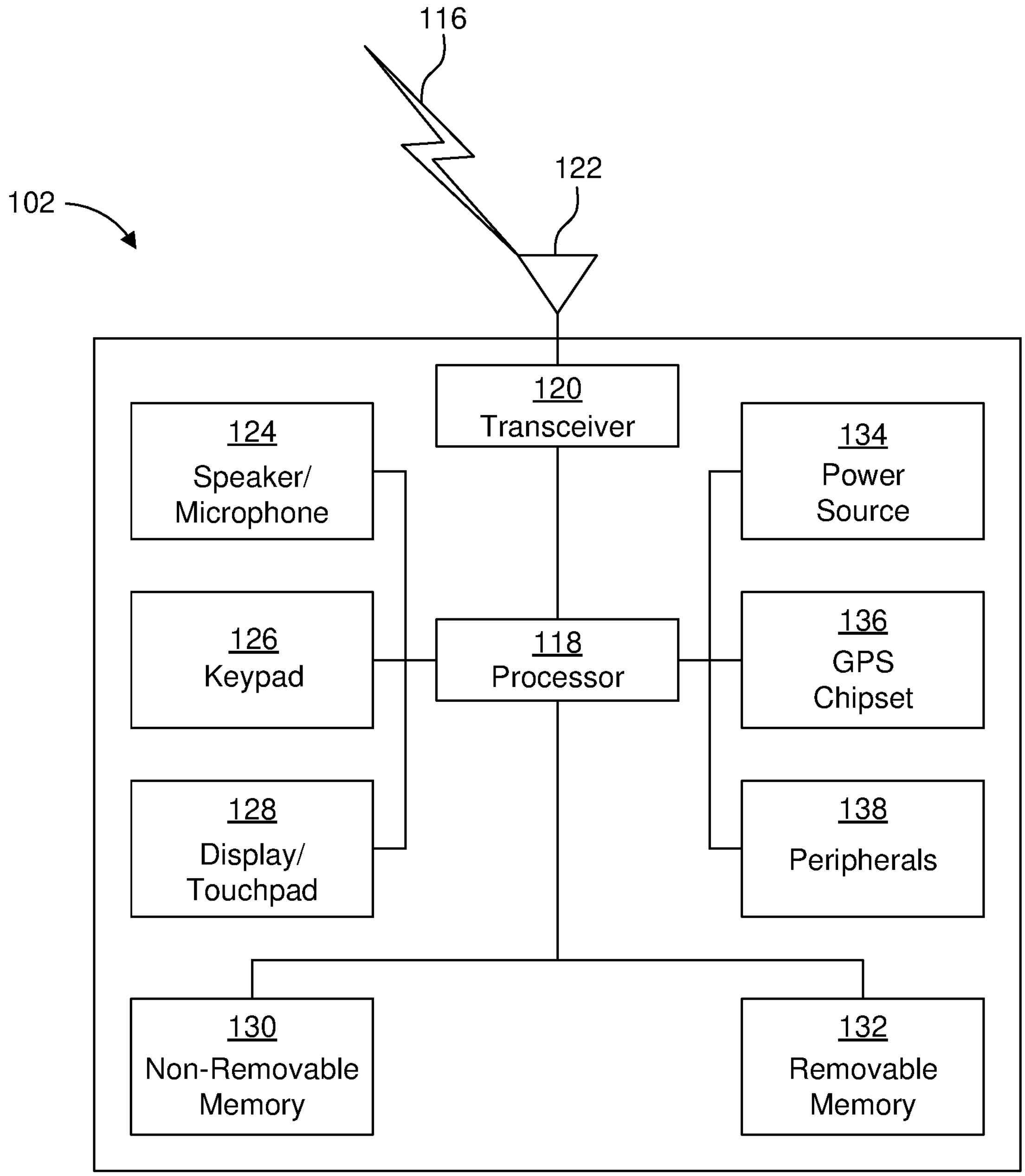
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114*a*) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
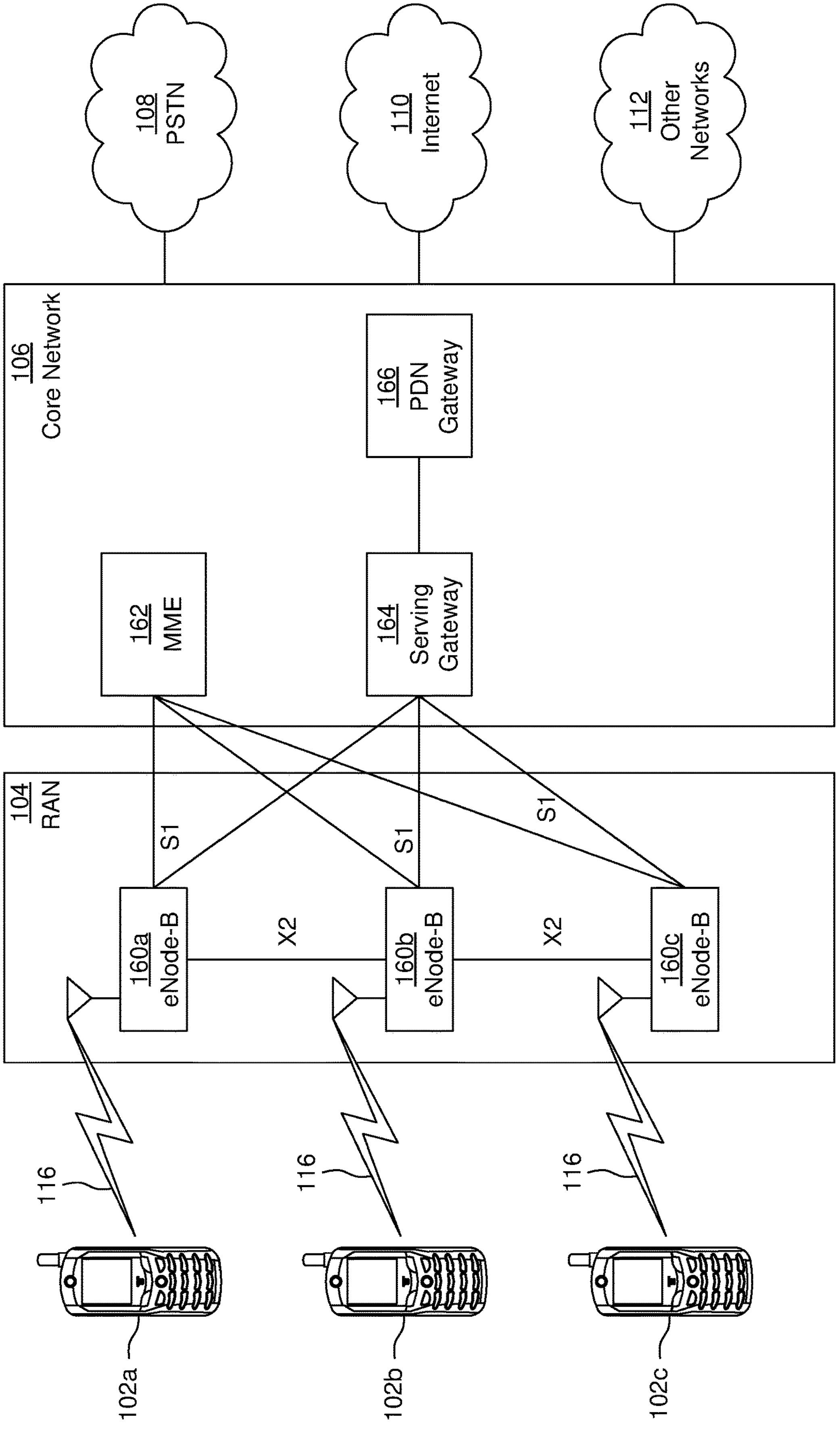
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, and 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink (UL) and/or downlink (DL), and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160*a*, 160*b*, and 160*c* in the RAN 104 via an SI interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode-Bs 160*a*, 160*b*, 160*c* in the RAN 104 via the SI interface. The SGW 164 may generally route and forward user data packets to/from the WTRUs 102*a*, 102*b*, 102*c*. The SGW 164 may perform other functions, such as anchoring user planes during inter-eNode-B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-ID as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHZ, and/or 160 MHz wide channels. The 40 MHz, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
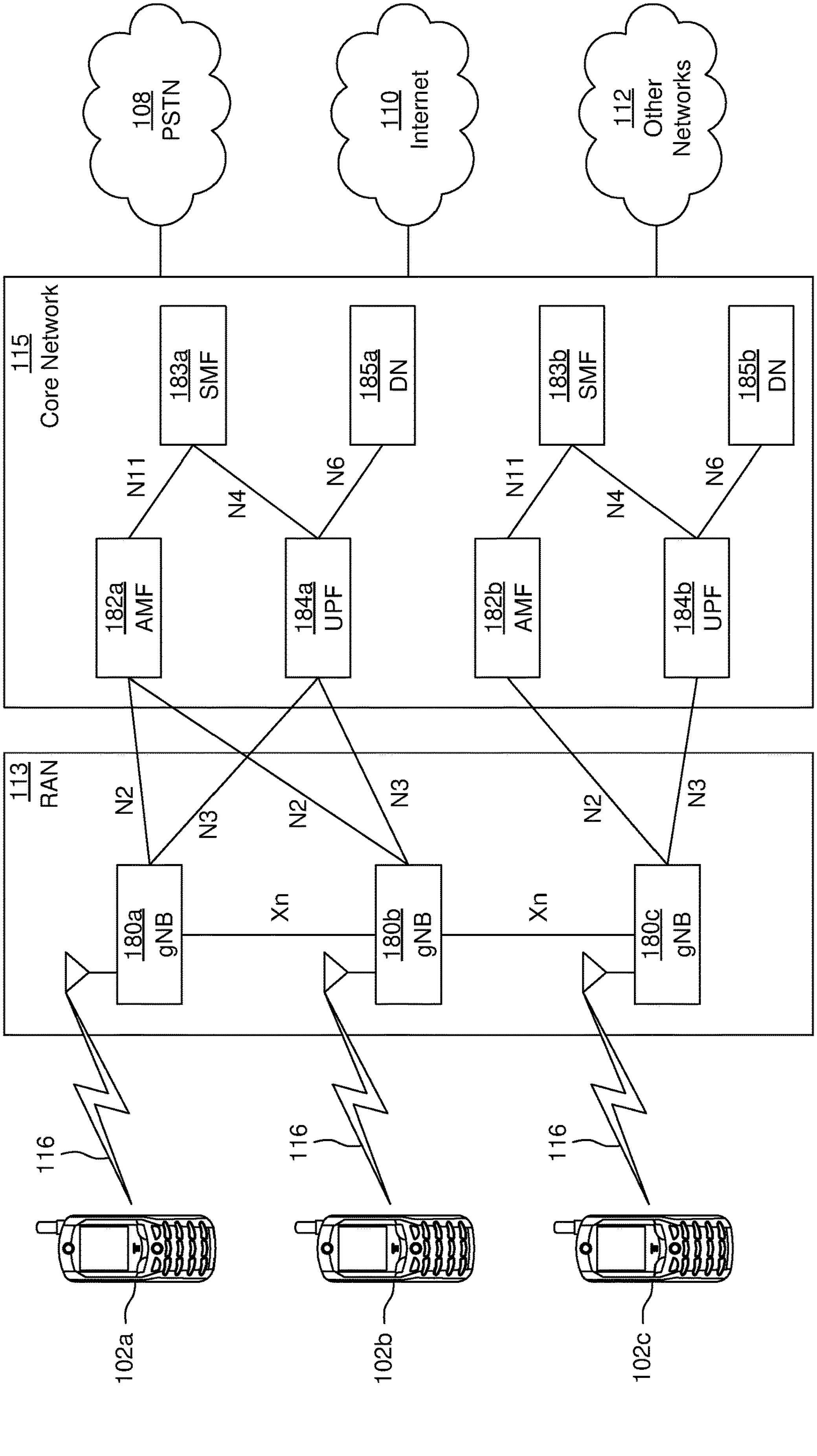
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In an embodiment, the gNBs 180*a*, 180*b*, 180*c* may implement MIMO technology. For example, gNBs 180*a*, 180*b* may utilize beamforming to transmit signals to and/or receive signals from the WTRUs 102*a*, 102*b*, 102*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., including a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184*a*, 184*b*, routing of control plane information towards access and mobility management functions (AMFs) 182*a*, 182*b*, and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one session management function (SMF) 183*a*, 183*b*, and at least one Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of NAS signaling, mobility management, and the like. Network slicing may be used by the AMF 182*a*, 182*b*, e.g., to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, e.g., to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In an embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-ID, one or more, or all, of the functions described herein with regard to any of: WTRUs 102*a-d*, base stations 114*a-b*, eNode-Bs 160*a-c*, MME 162, SGW 164, PGW 166, gNBs 180*a-c*, AMFs 182*a-b*, UPFs 184*a-b*, SMFs 183*a-b*, DNs 185*a-b*, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A deep neural network (DNN) may be a complex function mapping some input domain to another domain, the output. A DNN may be composed of several neural layers (typically in series) and each neural layer may be composed of several perceptrons. A perceptron may be a function that consists of a linear combination of the inputs and a non-linear function, for example a sigmoid function. Therefore, a DNN may be composed of two elements: the architecture, which includes the number of perceptrons and the connections between them, and the parameters, which may be the weights of the linear functions and, if required, the parameters of the non-linear functions. Trained by a machine learning (ML) algorithm on huge data sets, these models may have recently proven useful for a wide range of applications and may have led to significant improvements to the state-of-the-art in artificial intelligence (AI), computer vision, audio processing and several other domains. Due to their prevalence today, they are often referred to as a "AI/ML model".

An AI/ML Model may comprise (e.g. consist in) basically a set of weights values that may be learned during training for a specific architecture or configuration, where architecture or configuration specify what layers the model may contain, and how they may be connected. It is expected that many of the applications installed on the mobile devices will rely on AI/ML algorithms. In order to maintain or even improve the user experience, the AI/ML model that the application relies on may be first downloaded or updated. This download or update process may be fast and efficient and may not hamper the application.

Mobile Network Operators and Content Providers may face many challenges, for example any of:

- Make the AI/ML models available everywhere at any time for the maximum number of requesters.
- Provide an AI/ML model portfolio that encompasses a large diversity of mobile devices.
- Maintain the quality of service and/or avoid network congestion caused by simultaneous downloads of super-sized AI/ML models.

New methods to palliate the above-mentioned problems are described, by considering any of the following methods:

- Method to maintain the quality of service and/or avoid the network congestion, for example, due to the simultaneous downloads of super-sized AI/ML models by a huge number of users.

- Method to provide means for a WTRU 102 (e.g. UE) to collect AI/ML models from neighbors a WTRU 102 (e.g. UE), for example, with the support of a D2D Supervisor.
- Method to provide means for a WTRU 102 (e.g. UE) to choose which chunk of AI/ML models to collect from neighbors WTRU 102 (e.g. UE).

Mobile applications in 4G/5G/6G context will rely more and more on AI/ML models that will be downloaded onto end user devices over wireless networks. A recent study on AI/ML Model Transfer in 5GS in 3GPP SAI (TR22.874) proposes use-cases and defines high level requirements on this subject. As an example, during a social event, e.g., a concert or a car race, thousands of people use an application on their smartphone that may use (e.g., require) AI/ML models. These AI/ML models may be specific to the event area, specific to the social event itself, and/or may evolve during the social event itself with some environment changes like light or sounds.

When the event starts, thousands of people launch the application, which triggers thousands of downloads of the same AI/ML models. As each AI/ML model may be of several hundreds of Mbytes, this generates a tremendous downlink traffic, which may be very difficult to handle by the base station, and the AI/ML model server, in a very short period of time. As the available spectrum resources may be limited, this may lead to a limited throughput and possible congestion issues and delays, also as a consequence a poor QoE for the end user.

1 Model Split and Chunks Creation

Figure 2A:
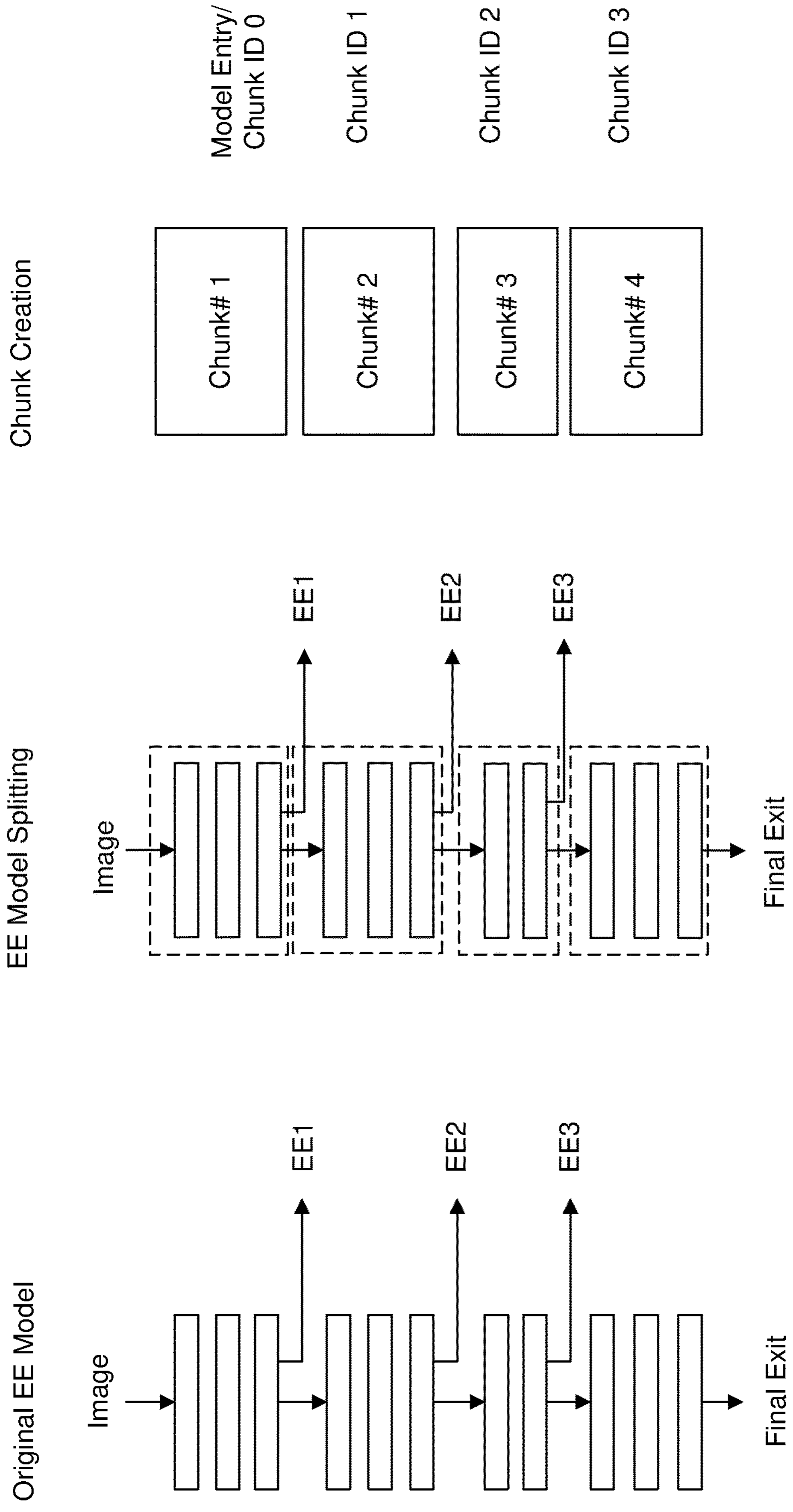
FIG. 2A illustrates a split of an AI/ML model.

FIG. 2A is an example that illustrates a split of an AI/ML model in several sub-models that may be referred as chunks. The architecture of this model may be based on layers and an Early Exit (EE) mechanism may be applied to it. This mechanism may aim at including within the model architecture some exits in addition to the final exit. When certain conditions (for example, confidence score) are satisfied by an Early Exit, the inference process may stop at that point and may send (e.g. return) a prediction result. This mechanism may enable a gain of time and may have been re-used in a different manner to propose a progressive model download.

In FIG. 2A, four chunks may be created. The chunk ID 0 may be the chunk entry and may have a very important role in the whole model reconstruction. Furthermore it may be used alone, as it does not depend on other chunks which is not the case of the other chunks.

Figure 2B:
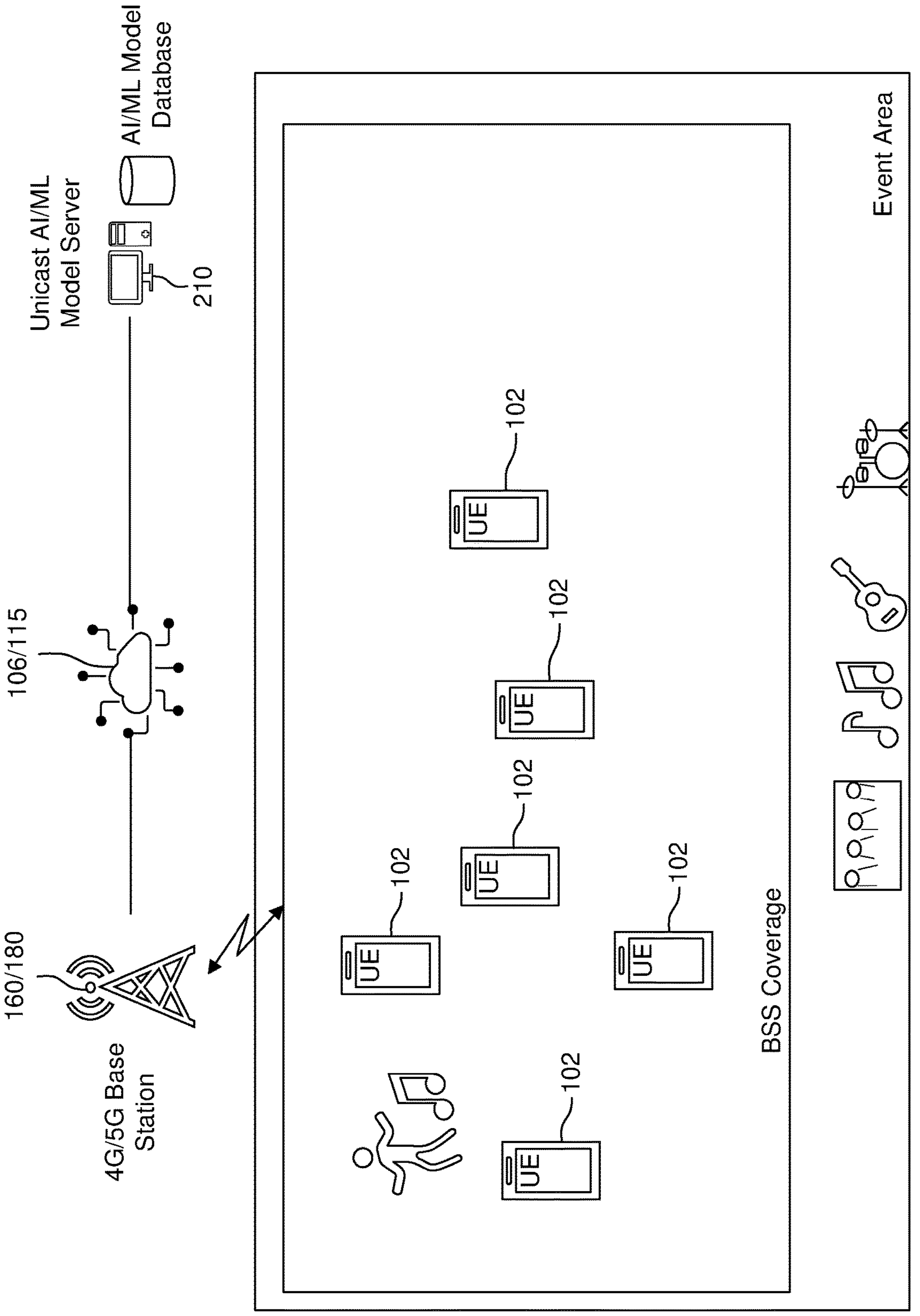
FIG. 2B illustrates an overview of a system for distributing AI/ML models.

FIG. 2B illustrates a setting where potentially a large set of WTRUs 102 (e.g. UEs) may want to download an AI/ML model from an AI/ML model server 210. The WTRUs 102 (e.g. UEs) may be located in a close vicinity, for example, in the same limited area where the network resources may be limited in regard to the amount of WTRUs 102 (e.g. UEs) requesting the AI/ML application data. The manifest application server, multicast AI/ML model server 210, unicast AI/ML model server 210 may be beside/co-located with the Base Station 160/180, in the edge, in the core network 106/115, or behind the core network 106/115.

The "Event Area" may be the area where the social event takes place, for example, a concert hall. This area may be considered as static during the event. It is assumed that some specific AI/ML models have been developed and trained for this specific event area. During the event the environment may change, for example, at some moments the light environment or sound environment may change.

A central entity called "D2D Supervisor" may enable and control the download of chunks of an AI/ML model between WTRUs 102 (e.g. UEs), for example, in the same vicinity.

The D2D Supervisor may aim at optimizing and/or preserving the spectrum usage by limiting the interactions between WTRUs 102 (e.g. UEs) in a case where multiple WTRUs 102 (e.g. UEs) may want to download AI/ML model chunks between each other. In a crowded environment with a very important amount of WTRUs 102 (e.g. UEs) trying to access the same kind of data in the same vicinity, the amount of transactions may grow very quickly and may lead to a very high and uncontrolled number of discovery messages and finally to sidelink congestion. In addition to this, with the current method, one WTRU 102 (e.g. UE) may serve (e.g., only) one other WTRU 102 (e.g. UE) at a time.

By imposing (sending an information indicating) to the Client WTRU 102 (e.g. UE) which chunk to download from which neighboring WTRU 102 (e.g. UE) and/or when, the D2D Supervisor may remove greatly the discovery messages and/or more broadly all the messages that could be used by the proximity WTRUs 102 (e.g. UEs) to determine which neighboring WTRU 102 comprises which chunk.

To reach that goal, the new D2D Supervisor entity may apply the next method:

- It may centralize information received from both the WTRUs 102 (e.g. UEs) and the Network Monitoring and Analyzing Function of the network (e.g. 5G/6G) system as follows:
  - The WTRUs 102 (e.g. UEs) may notify the D2D Supervisor what AI/ML model chunk they may have. The WTRU 102 (e.g. UE) may also report (send information indicating) any of: its location, speed, direction, and throughput with neighbor WTRU 102 (e.g. UE).
  - The Network Monitoring and Analyzing Function of the network (e.g. 5G/6G) system may report WTRU 102 (e.g. UE) information to the D2D supervisor such as any of: the location, speed, direction of (e.g., all) WTRUs 102 (e.g. UEs) involved in the D2D, the available throughput between WTRU 102 (e.g. UE) actors, and current/expected network congestion from the central to WTRUs 102 (e.g. UEs) communication and between WTRUs 102 (e.g. UEs).
- Based on those information, it may run a prediction and/or planning algorithm that may generate a list of triplets (Local D2D servers, chunk ID, scheduling).
- It may transmit the list to the Client WTRU 102 (e.g. UE), for example, when needed.
- The Client WTRU 102 (e.g. UE) may read the ordered list as a series of instructions that it should follow to download efficiently the chunks it may use (e.g. require).

As the download conditions (for example any of: position, distance, throughput, number and type of chunks) may be dynamic and evolved, the D2D Supervisor may recalculate and may update the list for the Client WTRU 102 (e.g. UE).

The list of triplets generated by the algorithm may be based on the next criteria but not limited to any of:

- The availability of the chunks.
- The type and the order of the chunks.
- The distance between WTRUs 102 (e.g. UEs) in the same vicinity.
- The throughput between WTRUs 102 (e.g. UEs) in the same vicinity.

Other criteria related to the chunk nature or to the WTRU 102 (e.g. UE) devices could also be taken into account as any of:

The chunk size.

The theoretical accuracy per additional chunk.

The WTRU 102 (e.g. UE) device type.

The WTRU 102 (e.g. UE) energy level.

If (e.g., once the list of triplets) is calculated for the Client WTRU 102 (e.g. UE), the next step may check whether this triplets candidates list does not overlap a list being used by another client in the same vicinity. One of the basic principle of this method may be one D2D WTRU 102 (e.g. UE) client per D2D WTRU 102 (e.g. UE) server at a time. A WTRU 102 (e.g. UE) may not (e.g. cannot) serve two or more other WTRUs 102 (e.g. UEs) at the same time. The planning algorithm may fulfill this requirement and in case of a possible overlap it may apply a non-overlap strategy. Different strategies may be proposed to control chunks download for optimizing overall download efficiency.

According to an embodiment, the method described may be based on a subscription mechanism. All the actors, D2D client WTRUs 102 (e.g. UEs) and D2D server WTRUs 102 (e.g. UEs) may have all subscribed to the same service and/or may be (e.g., therefore) known by the D2D Supervisor entity.

Figure 3:
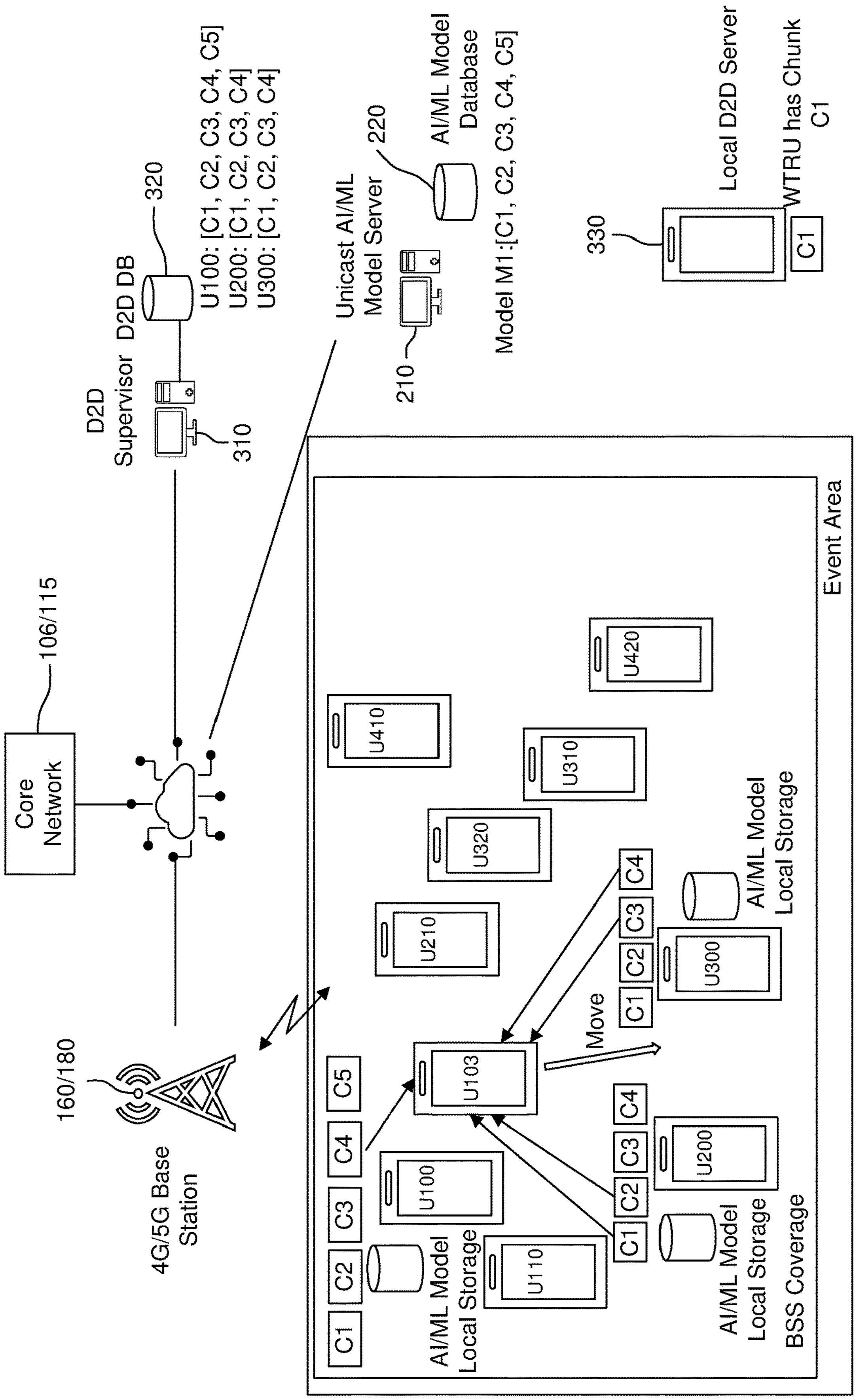
FIG. 3 illustrates an overview of a system for distributing AI/ML models, according to an embodiment.

FIG. 3 illustrates a setting where potentially a (e.g., large) set of WTRUs 102 (e.g. UEs) may want to download an AI/ML model from an AI/ML model server 210. The WTRUs 102 (e.g. UEs) may be located in a close vicinity in the same limited area, for example, where the network resources may be limited in regard to the amount of WTRUs 102 (e.g. UEs) requesting the AI/ML application data.

The AI/ML model M1 may be composed of chunks [C1, C2, C3, C4, C5].

WTRUs (e.g. UEs) U100, U200, U300 and U103 may be under BSS coverage and may have subscribed to the "D2D download service"

WTRUs (e.g. UEs) U100, U200 and U300 may have already downloaded chunks [C1, C2, C3, C4], and a WTRU (e.g. UE) U100 may have also downloaded chunk [C5] of the AI/ML model M1.

They may be considered as a "local D2D server" 330.

WTRU (e.g. UE) U103 may want to download AI/ML model M1. It may request the chunks to unicast AI/ML model server 210. For example, as it may begin to be overloaded by the WTRUs (e.g. UEs) request, the AI/ML model server may request the WTRU (e.g. UE) to try to collect the AI model from its neighbors.

WTRU (e.g. UE) U103 may be making a discovery of its neighbors (this discovery may be based on existing solution like ProSe or other protocols).

It may discover U100, U200 and U300.

WTRU (e.g. UE) U103 may be requesting (e.g. asking) the "D2D Supervisor" 310 to get the list of chunks to get in priority and/or from which WTRU (e.g. UE) at which time.

The D2D supervisor 310 may compute the best strategy for U103 regarding U100/U200/U300 mobility and chunk scarcity e.g. chunk C5. As a result, the ordered list may include a first element which may be to download C5 from U100 as soon as possible since U100 will be no longer in the vicinity of U103. The following list may be composed (U100: C5, t0-t1, expected availability t1+10s; U200: C1-C2: t1-t2; U300: C3-C4: t2-t3).

Exploiting this result, the WTRU (e.g. UE) U103 may (e.g. explicitly) request (e.g. ask) chunk C5 to UE100.

Then as WTRU (e.g. UE) U103 may be moving towards WTRU (e.g. UE) U200 and WTRU (e.g. UE) U300, it may collect [C1, C2] from WTRU (e.g. UE) U200 and [C3, C4] from WTRU (e.g. UE) U300.

The D2D Supervisor 310 may add the reference "U103 chunks [C1, C2, C3, C4, C5]" in its database 320.

U103 may be now considered as a local D2D Server 330.

Figure 4:
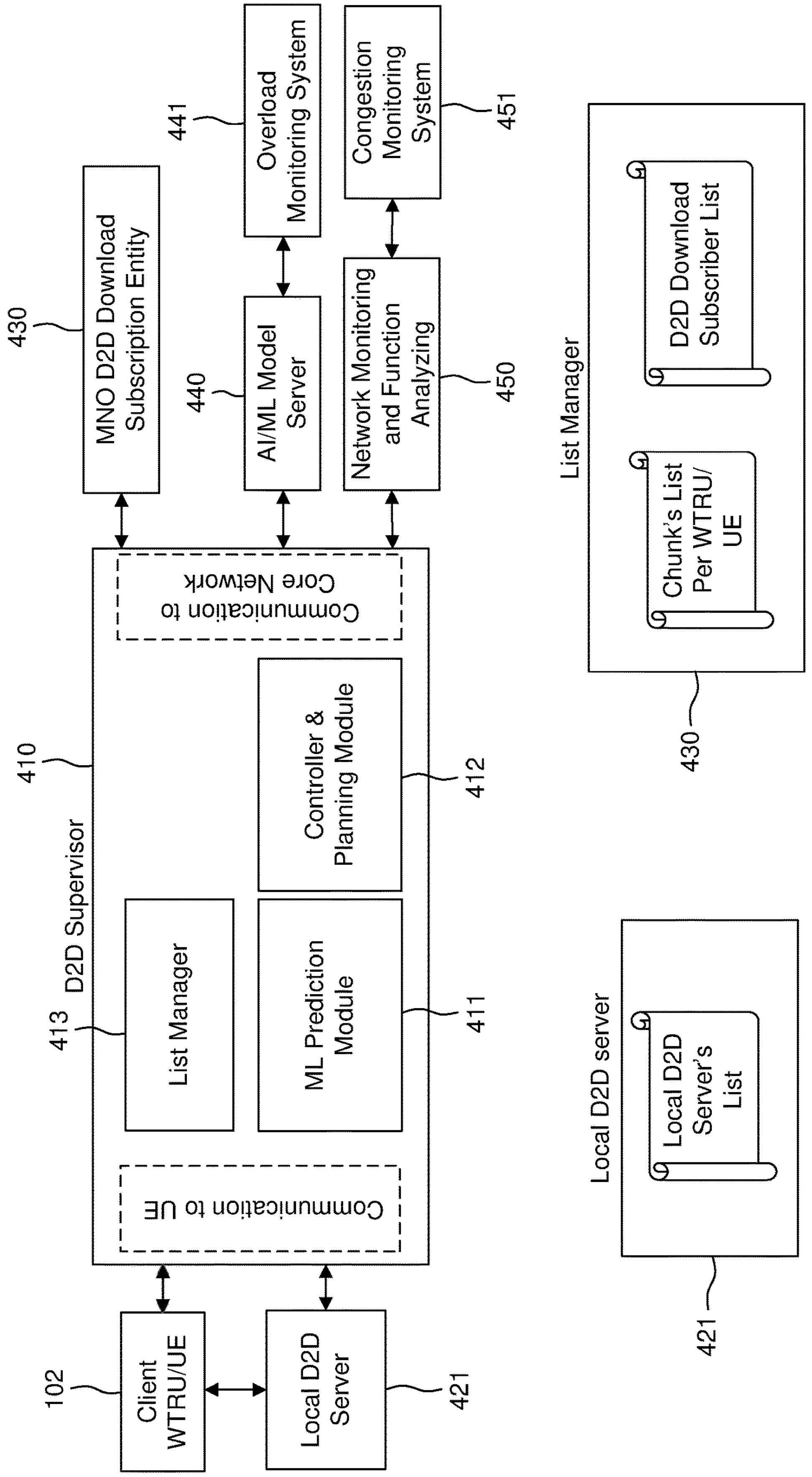
FIG. 4 illustrates an overview of a system architecture for distributing AI/ML models, according to an embodiment.

With this architecture, the D2D Supervisor 310 may have a central role. The D2D Supervisor 310 may have an overview of the situation which may be not the case of the WTRU 102 (e.g. UE) devices in place. This division of the AI/ML model into several chunks may enable the capacity to share the necessary bandwidth to collect all the chunks between several users. A user may also collect chunks from both the AI/ML model server 210 and WTRUs 102 (e.g. UEs). FIG. 4 illustrates a D2D Supervisor architecture overview.

2 Block 410: D2D Supervisor-Overview

The D2D Supervisor architecture may be based on a Client-Server architecture. The D2D Supervisor may be located in the network at the edge or in the cloud. The D2D Supervisor [410] may be managed by the Mobile Network Operator (MNO) or by a third party. The D2D Supervisor may interact with the AI/ML model server and/or with a Network Monitoring and Analyzing Function as described below. On behalf of the AI/ML Model Server 440 and/or the Network Monitoring and Analyzing Function 450 (e.g. from the 5G/6G System), The D2D Supervisor may aim at serving WTRUs 102 (e.g. UEs) so that they may manage downloading the proper AI/ML model. The D2D Supervisor may contain some processing units and memory units (e.g., necessary) to run a prediction algorithm. The D2D Supervisor may also manage the possible conflicts that may happen in a case where many Client WTRUs 102 (e.g. UEs) may be in the same close vicinity and may use (e.g. require) a chunk to the same Local D2D Server at the same time. This arbitration task is described hereinafter. The D2D Supervisor 410 may receive from each Client WTRU 102 (e.g. UE) a D2D Server List and aggregate them. (There may be one D2D server List per Client UE).

3 Block 413: List Manager

This entity may aim at managing the lists stored by the D2D Supervisor.

3.1 Chunk's List Per UE

Figure 5:
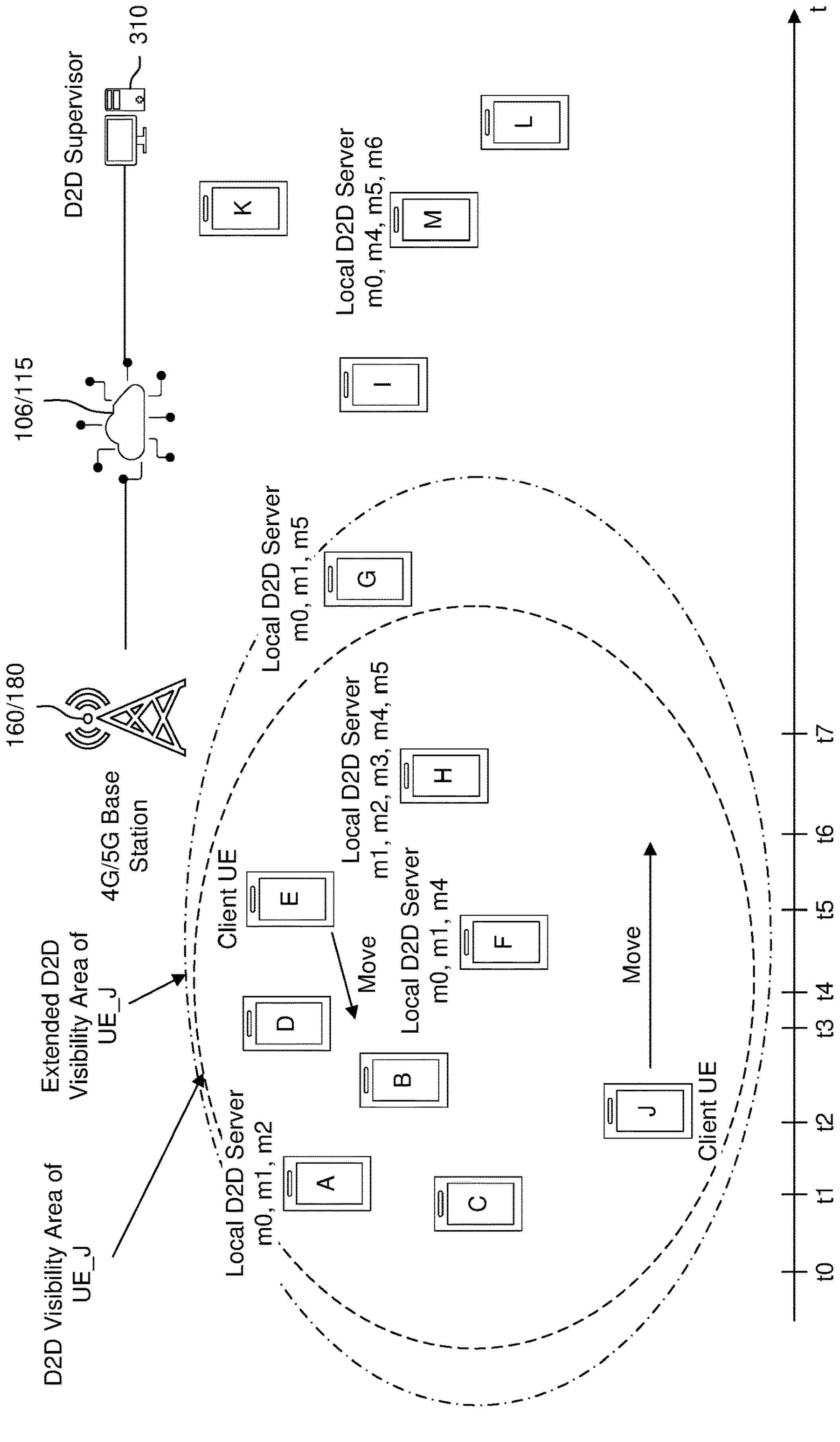
FIG. 5 illustrates an overview of a system architecture for distributing AI/ML models, according to an embodiment.

FIG. 5 illustrates an overview of a system architecture for distributing AI/ML models.

Four Local D2D Servers may have already downloaded chunks from the AI/ML Model server. The AI/ML model server may notify the D2D Supervisor 310 of the downloads (WTRU 102 (e.g. UE) identifier and/or chunk identifier) and the D2D Supervisor 310 may store them:

UE_A: {m0, m1, m2}

UE_F: {m0, m1, m4}

UE_G: {m0, m1, m5}

UE_H: {m0, m1, m2, m3, m4, m5}

The chunk download may be performed from a proximity device, the Client WTRU 102 (e.g. UE) may notify (send information indicating) the D2D Supervisor 310 of the successful download (WTRU 102 (e.g. UE) identifier+ chunk identifier) and the D2D Supervisor 310 may create, if not already done, a list for this Client WTRU 102 (e.g. UE) in which it may add the chunk identifier.

The Client UE_J may download the chunk m0 from the Local D2D Server UE_A. The D2D Supervisor 310 may create this list: UE_J: {m0}.

The D2D Supervisor 310 may update the existing lists if the Local D2D Servers download new chunks. Each Local D2D Server may notify the D2D Supervisor in a case where it may have downloaded a new chunk, thus may become potentially a new D2D server if not already.

3.2 D2D Download Subscriber List

Figure 6:
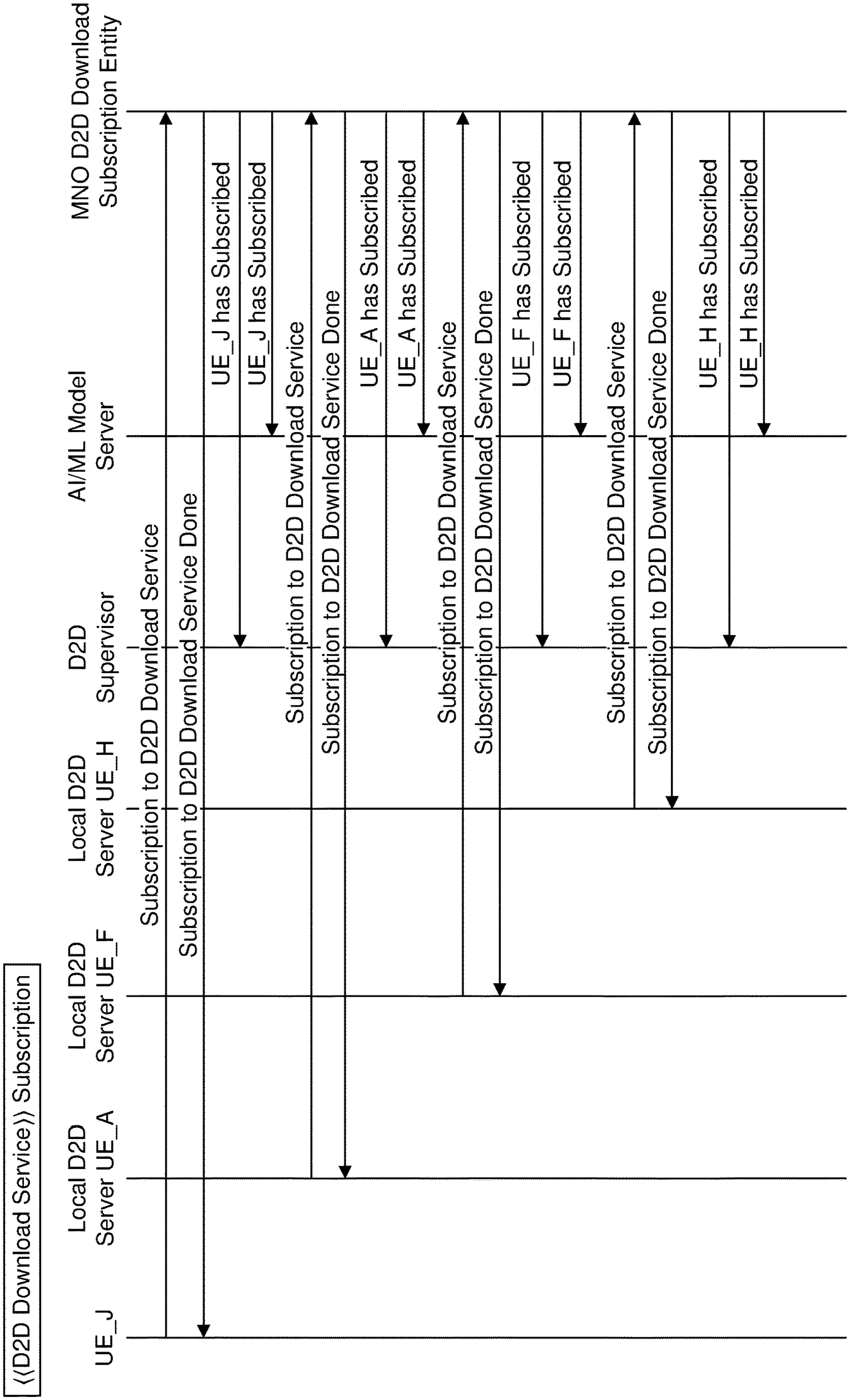
FIG. 6 illustrates a sequence diagram for performing a D2D download subscription, according to an embodiment.

FIG. 6 illustrates a sequence diagram for performing a D2D download subscription. As shown in FIG. 6, a WTRU 102 (e.g. UE) may subscribe to the "D2D download service" to the MNO entity, the MNO entity may notify D2D Supervisor for receiving a new D2D download subscription. As a result, the D2D supervisor may update the D2D download subscriber list.

UE_J, UE_A, UE_F, UE_H and UE_G may have subscribed, the D2D download subscriber list may be: {UE_J, UE_A, UE_F, UE_H, UE_G}.

4 Block 421: Local D2D Server

A local D2D server may be a WTRU 102 (e.g. UE) that may have subscribed to the "D2D download service" (via MNO or by a third party) and/or which may deliver a variety of the model chunks that it may have already downloaded and temporary stored.

The local D2D download policy may be as follows: A Local D2D Server may serve (e.g. only) one Client WTRU 102 (e.g. UE) at a time.

According to embodiments, other policies may be envisioned where the local D2D server may deliver the chunks in multicast/broadcast modes to a group of WTRUs 102 (e.g. UEs) in the same vicinity.

A local D2D Server 421 may keep (e.g., store) the downloaded chunks for a fixed period of time, for example, if its memory resources are limited or as long as it can.

5 Block 102: Client WTRU

The architecture may be based on a Client-Server architecture.

The Client WTRU 102 (e.g. UE) may use (e.g. require) an AI/ML model for its application, and may send a request to the AI/ML Model Server.

The Client WTRU 102 (e.g. UE) may receive a response from the server. For different reasons (server overload or network congestion), the AI/ML Model server may not (e.g. cannot) handle Client WTRU 102 (e.g. UE) request, and the Client WTRU 102 (e.g. UE) may rely on the Local D2D Servers because it may have subscribed to the "D2D Download service". The Client WTRU 102 (e.g. UE) may run discovery requests in its vicinity, to identify the Local D2D servers, it may collect all the responses and/or may fill in a Local D2D Server List with discovery responses. The Client WTRU 102 (e.g. UE) may transmit the Local D2D Server List to the D2D Supervisor [410].

The D2D server list may be created once, in a case where the D2D download service is activated on the Client WTRU 102 (e.g. UE) or whenever it may be used (e.g. required) by the D2D Supervisor.

The Client WTRU 102 (e.g. UE) may receive lists from the D2D Supervisor which contains triplets of Local D2D Server, Chunk ID and scheduling information.

For (e.g., each) a successful chunk download, the Client WTRU 102 (e.g. UE) may return a message to the D2D Supervisor indicating (e.g. telling) that the Chunk ID have been successfully downloaded.

The client WTRU 102 (e.g. UE) may interact with the Local D2D Servers as previously defined, and the D2D Supervisor as previously defined.

6 Block 430: MNO D2D Download Subscription Entity

This entity may register all the WTRUs 102 (e.g. UEs) that may want to subscribe to the "D2D download service". The subscription may be accepted if the WTRUs 102 (e.g. UEs) support a D2D (Device to Device) protocol like ProSe/Sidelink and/or if they have storage capabilities.

The subscription entity may report to the AI/ML Model Server and/or to the D2D Supervisor which WTRU 102 (e.g. UE) may have subscribed to the service.

7 Block 440: AI/ML Model Server

This module may be a server that may be in charge of distributing the AI/ML models. AI/ML models may be provided in full formats or in chunks formats. In case of full format delivery, the AI/ML model may be delivered in full as a unique entity. In case of chunks format, the AI/ML model may be delivered chunk by chunk, each chunk being a piece of the full model.

8 Block 441: Overload Monitoring System

This module may be in charge to monitor whether the AI/ML model server may be overloaded. AI/ML model server overload means that the server may not (e.g. cannot) handle all the download requests it may receive. This module may be part of the block 440, e.g. the AI/ML model server itself.

9 Block 450: Network Monitoring and Analyzing Function

This function may be part of the network (e.g. 5G/6G) system. It may have access to various information from the network itself but also from the connected WTRUs 102 (e.g. UEs). It may gather information about the throughput on the RAN, on each WTRU 102 (e.g. UE), but also on any of the location, the speed and the direction of each WTRU 102 (e.g. UE). The Network Data Analytics Functions (NWDAF) as defined by the 3GPP may fulfill (e.g. partially) this role.

10 Block 451: Congestion Monitoring System

This function may be part of the network (e.g. 5G/6G) system. It may have access to various information from the network itself and may detect or predict a network congestion.

11 Block 410: D2D Supervisor

Prediction and planning may be the two main tasks of the D2D Supervisor 410. The D2D Supervisor 410 may collect some status data of many WTRUs 102 (e.g. UEs), for example, evolving in a close vicinity and/or may fit these data in a prediction algorithm. For one Client WTRU 102 (e.g. UE) and for one period of time the algorithm may return a list of pairs (Local D2D Server, Chunk ID). For other Client WTRUs 102 (e.g. UEs) in the same vicinity and in the same period of time, the algorithm may provide other results. The controller and planning task may have to do some arbitration to avoid that many WTRUs 102 (e.g. UEs) try downloading chunks from the same Local D2D Server, the list of pairs may be completed with a scheduling information and therefore becomes a list of triplets (Local D2D Server, Chunk ID, scheduling).

11.1Block 411: Prediction Algorithm-Overview

The prediction algorithm may run on the D2D Supervisor and may aim at predicting which chunk may be downloaded by which local D2D server. The prediction algorithm may be valid for one Client WTRU 102 (e.g. UE).

11.2Block 412: Controller and Planning Task

This planning task may include (e.g. consists in) estimating on the path of the mobile WTRUs 102 (e.g. UEs), e.g., UE_J and UE_E, the Local D2D servers which may deliver to both Client WTRUs 102 (e.g. UEs) one or more chunks at certain time with the best efficiency. The D2D Supervisor 410 may provide a list of triplets (Local D2D Server, chunk ID, scheduling) to both Client WTRUs 102 (e.g. UEs) that they may follow as a download roadmap/planning. The chunk downloads may be planned by the D2D Supervisor for the Client WTRUs 102 (e.g. UEs). The Client WTRUs 102 (e.g. UEs) may not decide by themselves to which Local D2D server they may address, and which chunk they may download. When Client WTRUs 102 (e.g. UEs), UE_J and UE_E may be both in a close vicinity, request (e.g., require) the same AI/ML models and have subscribed to the same "D2D download service", the D2D Supervisor may also arbitrate which Local D2D Server the Client WTRUs 102 (e.g. UEs) may address first in the case where both may use (e.g. require) a chunk available from this Local D2D Server. This arbitration may be part of the planning task.

Figure 7:
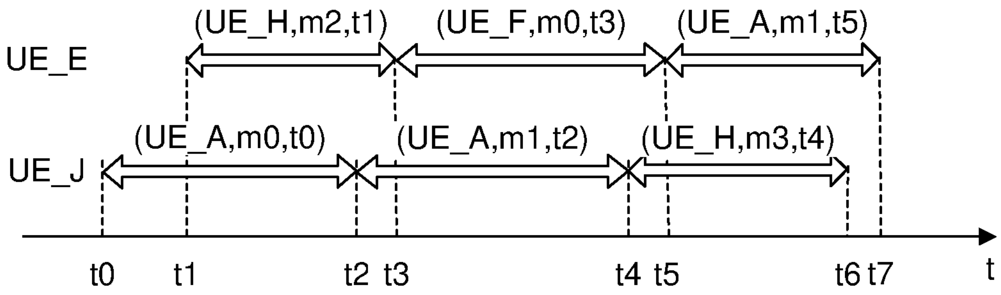
FIG. 7 illustrates a sequence diagram for performing AI/ML model downloading, according to an embodiment.

FIG. 7 illustrates a sequence diagram for performing AI/ML model downloading. According to FIG. 7, two Client WTRUs 102 (e.g. UEs) (UE_E and UE_J) may have both received a list which corresponds to their download roadmap. UE_J may download the chunk m0 from UE_A at t0, then m1 from UE_A at t2 and finally m3 from UE_H at t4. UE_E may download the chunk m2 from UE_H at t1, then m0 from UE_F at t3 and m1 from UE_A at t5. In this example UE_J and UE_E may not (e.g., never) download a chunk from the same Local D2D Server.

12 D2D Download Sequence

This section aims at describing how all the actors of the proposed method interact, e.g., Client WTRU 102 (e.g. UE), D2D Supervisor, Local D2D Server and the AI/ML server. To that end, FIG. 5 illustrates a case where two Client WTRUs 102 (e.g. UEs) (UE_J and UE_E) may be moving in a limited area where many Local D2D Servers may be evolving.

Some call flow diagrams illustrate the main steps of the method:

D2D download service subscription.
Chunk download.
D2D download service start-up.
The prediction process.

12.1D2D Download Service Subscription

Referring to FIG. 6 depicting a D2D download subscription service call flow, UE_J, UE_A, UE_F, and UE_H all subscribe to the "D2D download service" put in place by the Mobile Network Operator and/or a third party, and there may be known by the D2D Supervisor that manages this offloading service.

UE_J, UE_A, UE_F, and UE_H may subscribe to this service because they all support a D2D/sidelink technology.

In a case where the subscription may be done, UE_J, UE_A, UE_F, and UE_H may know the address of the D2D Supervisor that may be in the return message "subscription to D2D download service done".

12.2Block 410: AI/ML Chunk Download Example

Figure 8:
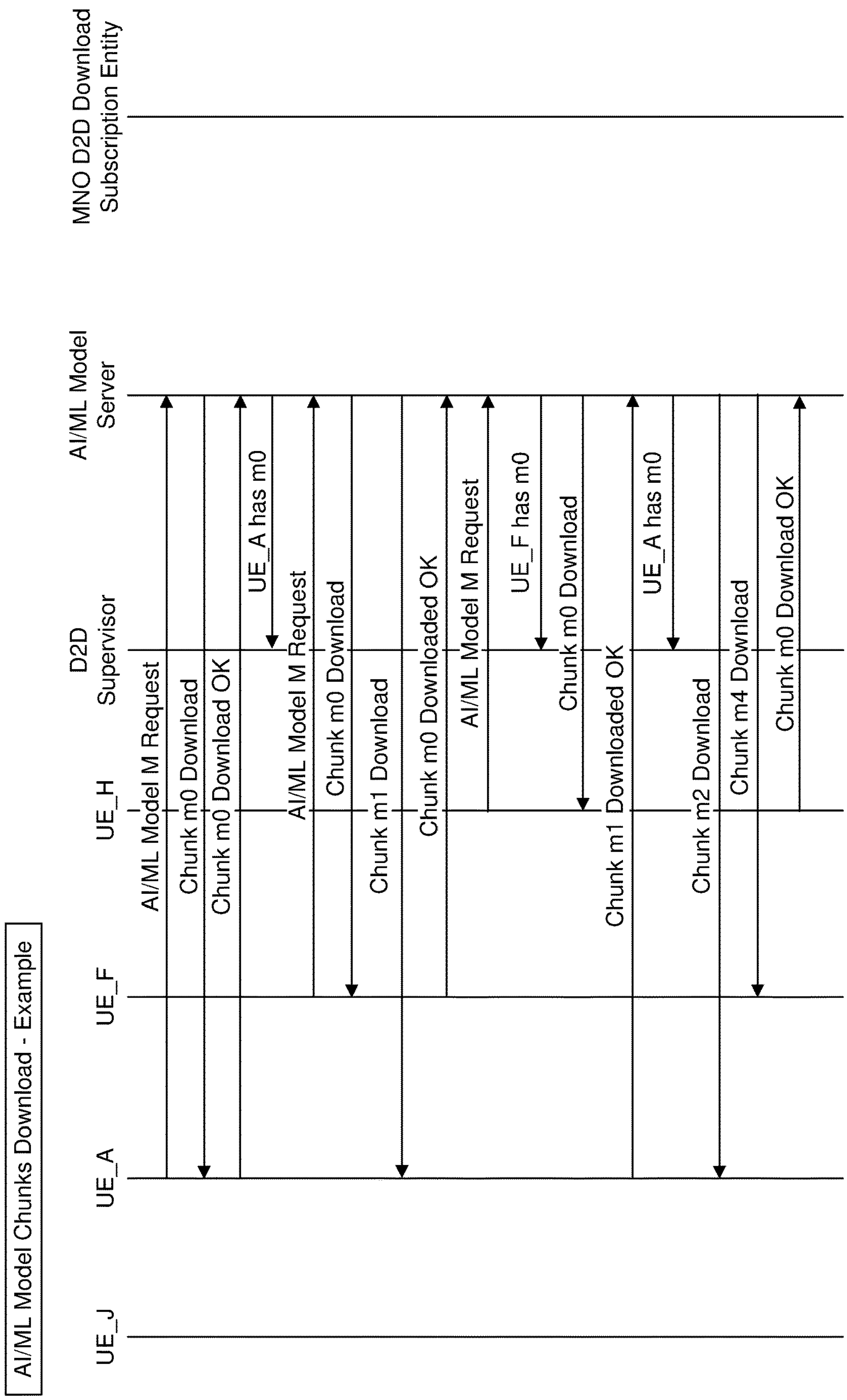
FIG. 8 illustrates a sequence diagram for performing AI/ML chunk downloading, according to an embodiment.

FIG. 8 illustrates a sequence diagram for performing AI/ML chunk downloading. According to FIG. 8, UE_A, UE_F and UE_H download the AI/ML model "M" chunk by chunk. This model "M" may be split in n chunk m0, chunk m1, . . . , chunk mn-1. As they subscribe to the "D2D download service", they may keep the downloaded chunks for certain duration in the case where a proximity device that also may have subscribed to this service may use (e.g. require) them. This storage duration may be fixed and defined by the D2D Supervisor. This duration may be expressed in milliseconds or seconds, it may also be a counter of downloads, in a case where the number of download may be reached, the WTRU 102 (e.g. UE) may drop the chunk. To free some memory space, the WTRU 102 (e.g. UE) may decide by itself to drop the stored chunk, it may then send a message to the D2D Supervisor indicating (e.g. telling) which chunk was dropped.

For a (e.g., each) downloaded chunk, the AI/ML model server may send a message to the D2D Supervisor indicating (e.g. telling) that the chunk may be now available on a particular device. By doing so, the D2D Supervisor may register which WTRU 102 (e.g. UE) device may have which model chunk. This registration may be done in the "chunk's list per UE" entity of the D2D Supervisor as illustrated in FIG. 4.

All the WTRUs 102 (e.g. UEs) that may have subscribed to the "D2D download service" and which may have at least one chunk available for download may be potential Local D2D servers.

UE_A, UE_F and UE_H may be now Local D2D servers.

Figure 9:
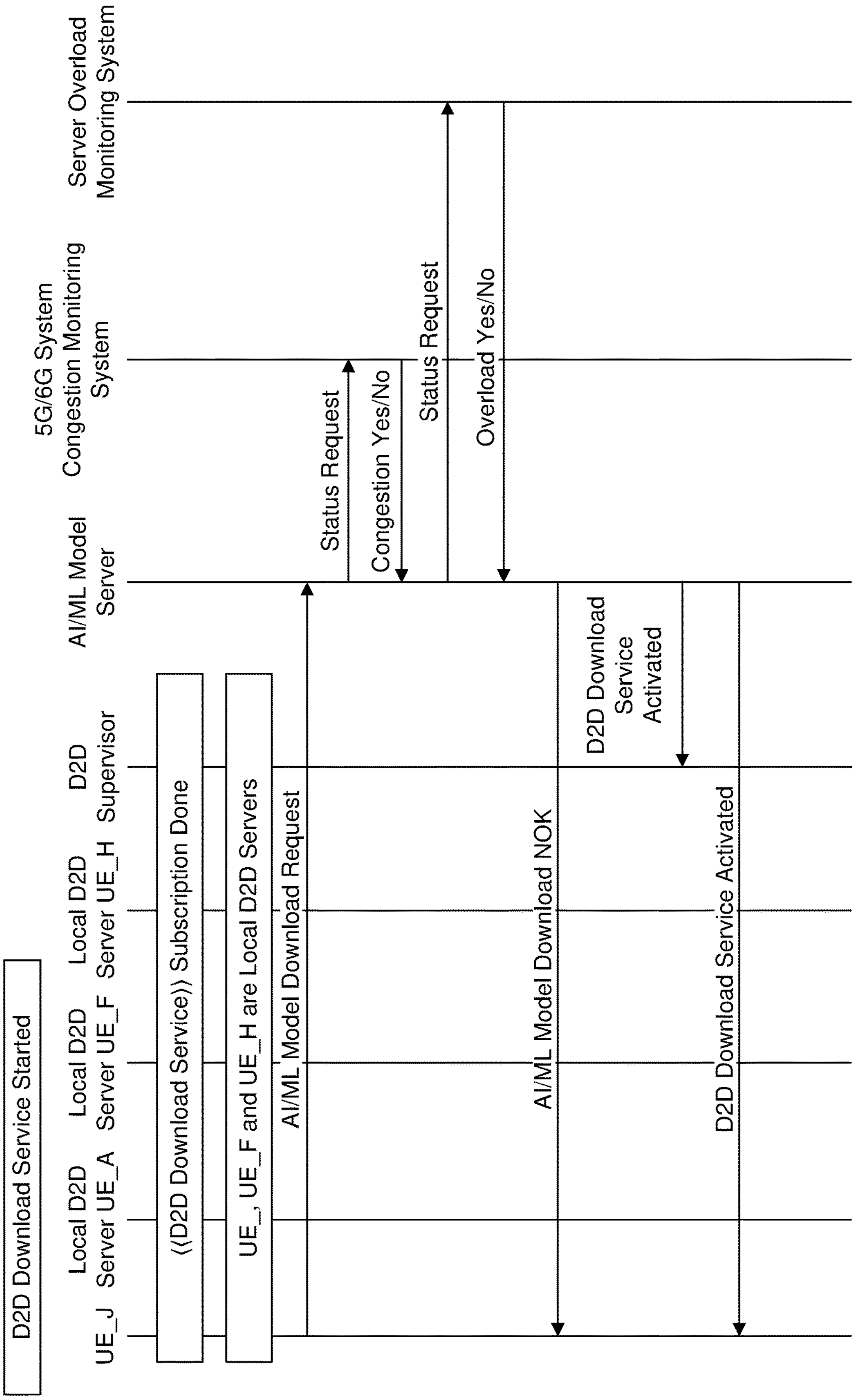
FIG. 9 illustrates a sequence diagram for starting a D2D download service, according to an embodiment.

FIG. 9 illustrates a sequence diagram for starting a D2D download service.

According to FIG. 9, a UE_J may want to download an AI/ML model "M", it may send a request to the AI/ML model server in the cloud/edge. In regard to the huge number of download requests it may receive, the AI/ML model server first may exchange messages with the network (e.g. 5G/6G) system to evaluate the risks of traffic congestion. The congestion may be at the RAN level or at the core network backend level. The AI/ML Model server itself may check whether there may be no risk of overload.

The network (e.g. 5G/6G) system (congestion monitoring system) may send information indicating (e.g., answer) to the AI/ML model server that the risks may be very high, the downlink traffic may have reached the threshold above which offloading solutions may be triggered.

The AI/ML model server may request (e.g. ask) the D2D Supervisor to activate the D2D download service for UE_J.

The AI/ML model server may reply negatively to UE_J initial request and/or may send an additional message to activate (if not already done) the "D2D download service". The AI/ML model server may hand over to the D2D Supervisor.

12.3 Block 410: D2D Server Discovery and First Prediction Example

Figure 10:
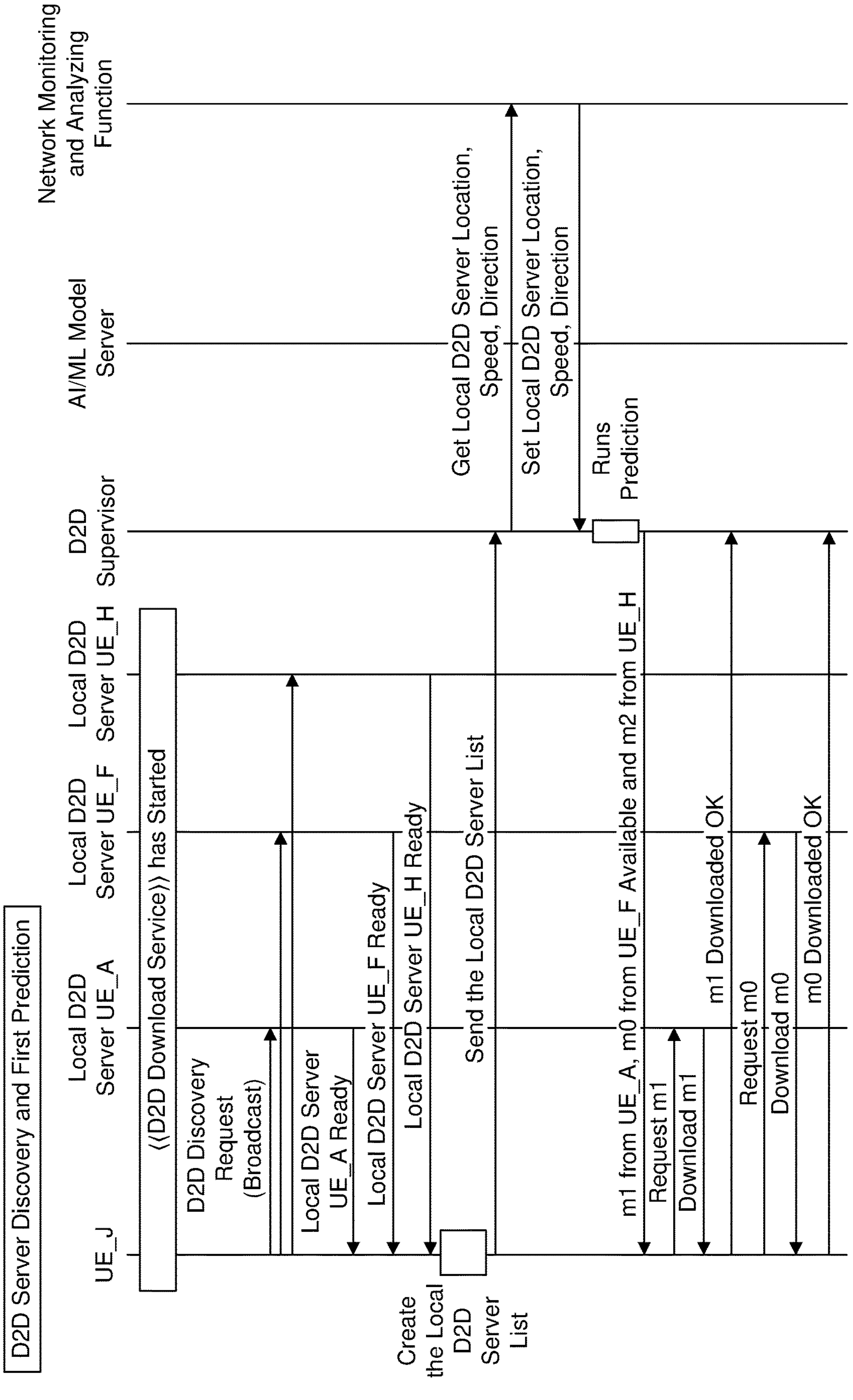
FIG. 10 illustrates a sequence diagram for performing a D2D server discovery and first prediction, according to an embodiment.

FIG. 10 illustrates a sequence diagram for performing a D2D server discovery and first prediction.

As shown in FIG. 10, to get the AI/ML model, UE_J may use the "D2D download service". It may broadcast a D2D discovery request in its vicinity (D2D visibility area as shown in FIG. 5) to search for Local D2D servers, e.g. other WTRUs 102 (e.g. UEs) that may have also subscribed to the "D2D download service" and/or which may deliver a variety of the model chunks they may have already downloaded.

UE_A, UE_F and UE_H may respond positively.

UE_J may transmit this Local D2D server list {UE_A, UE_F, UE_H} to the D2D Supervisor.

The D2D Supervisor may receive the list and may check that the members of this list may be part of its "D2D download service list". It then may request (e.g. ask) to the Network Monitoring and Analyzing Function the location of each WTRU 102 (e.g. UE), its speed and/or its direction.

The Network Monitoring and Analyzing Function may send (e.g. return) the location, the speed and/or the direction of the WTRUs 102 (e.g. UEs) which may be located in the extended D2D visibility area as shown in FIG. 5. This extended D2D visibility area may be (e.g., only) visible by the network (e.g. 5G/6G) system.

The Network Monitoring and Analyzing Function may send (e.g. return) the location, the speed and/or the direction of {UE_A, UE_F, UE_H, UE_G}.

Based on these information for example, the D2D Supervisor may run a prediction algorithm that may indicate (e.g. tell) which WTRU 102 (e.g. UE) may serve UE_J, with which chunk.

The D2D Supervisor may send a message to UE_J indicating (e.g. telling) that it may download the m1 chunk from the proximity D2D server UE_A at t0, the m0 chunk from UE_F at t1 and the m2 chunk from UE_H at t3. The message format may be a list: {(UE_A, m1, t0), (UE_F, m0, t1), (UE_H, m2, t2)}

UE_J may receive the list of triplets and at to may send a request to UE_A to download the chunk m1.

In the local D2D request message, UE_A may be informed that UE_J may have also subscribed to the "D2D download service", (e.g., therefore) it may accept the requests and the UE_J may start the m1 chunk download.

While downloading chunk m1, UE_J may continue moving and its movement may be tracked by the D2D Supervisor (via the Network monitoring and analyzing function) which may (e.g., continuously) recalculate the prediction that may indicate (e.g. tell) which chunk UE_J may be downloaded next and with which Local D2D server and/or at which predicted scheduled time.

In the case where the prediction is not changed, the D2D Supervisor may not (e.g., need to) send an update message to UE_J.

At the end of the download, UE_J may check the m1 chunk integrity and/or may send a message to the D2D Supervisor telling it may have successfully downloaded m1.

UE_J may move forward in its Local D2D server candidates list and at t1 may send a request to UE_F to download the chunk m0.

In the request message, UE_F may be informed that UE_J may have subscribed to the "D2D download service", (e.g., therefore) it may accept the requests and the UE_J may start the chunk m0 download.

12.4Block 410: Chunk Download and Prediction Update

In the meanwhile, the D2D Supervisor may have generated a new prediction.

Figure 11:
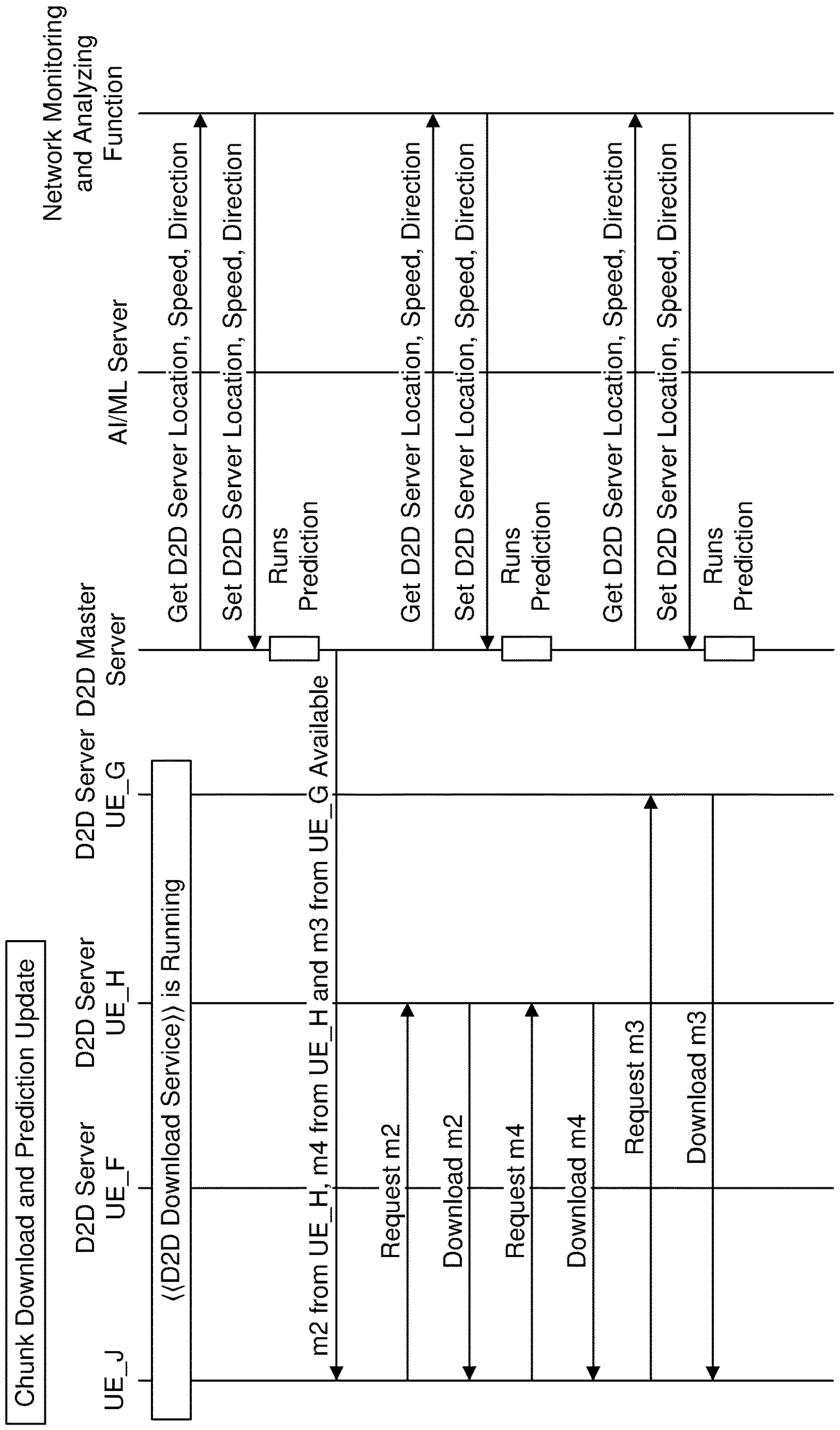
FIG. 11 illustrates a sequence diagram for performing a Chunk download and prediction update, according to an embodiment.

There may be two (e.g., significant) changes: UE_H may deliver at t3 the m4 chunk in addition to m2, and UE_G may deliver at t4 the chunk m3. Due to these (e.g., important) updates, the D2D Supervisor may send a message to UE_J indicating (e.g., saying) that it may download the chunks m2 and m4 from the proximity D2D server UE_H. It may download the chunk m3 from UE_G. This is shown in FIG. 11 illustrating a sequence diagram for performing a Chunk download and prediction update. According to FIG. 11, the new transmitted list may be {(UE_A, m1, t0), (UE_F, m2, t1), (UE_H, m2, t2), (UE_H, m4, t3), (UE_G, m3, t4)}.

In the case where it runs the D2D discovery request, UE_J may receive no response from UE_G because it may be too far and/or its signal may be too poor. (E.g., only) The network (e.g. 5G/6G) system may see it and may provide the information to the D2D Supervisor, for example, so that it may anticipate the future download possibilities/solutions. UE_J may have moved and may be now in the vicinity of UE_G, therefore the chunk download will be feasible as planned by the D2D Supervisor.

13 Block 411: Detailed Prediction Algorithm

Figure 12:
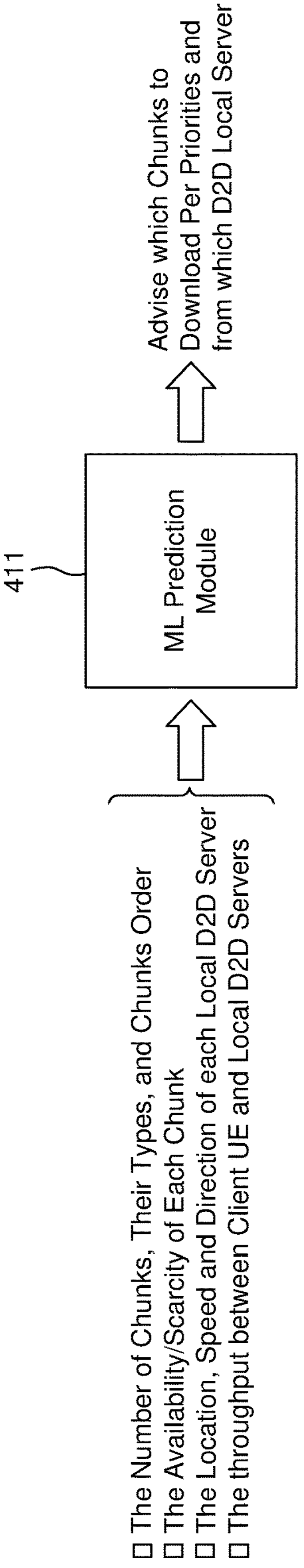
FIG. 12 illustrates a sequence of a prediction algorithm, according to an embodiment.

FIG. 12 illustrates a sequence of a prediction algorithm. According to FIG. 12, the prediction algorithm may run on the D2D Supervisor and/or may aim at predicting which chunk may be downloaded by which local D2D server.

The inputs of this algorithm may be any of:

- The number of chunks, their types, and chunks order;
- The availability/scarcity of each chunk;
- The location of each local D2D server;
- Optionally, speed and direction of each local D2D server; and
- The throughput between client WTRU 102 (e.g. UE) and local D2D servers.

The algorithm may handle these inputs in different ways. They all help predicting which chunk may be downloaded by which specific local D2D server. But some of these inputs may not have the same importance than others, a weight may be applied to some of them following different criteria. For instance, the chunk scarcity may be one of the criteria. All the outcomes for the selection criteria may be finally compiled and a final score may be given for each of the available chunk and Local D2D server. A list of chunks and Local D2D servers may be produced, e.g. {(UE_A, m1), (UE_F, m0), (UE_H, m2)}. The D2D Supervisor may check whether this list may be transmitted and if it is the case may transmit it to the Client WTRU 102 (e.g. UE), UE_J of the embodiment in FIG. 10.

Figure 13:
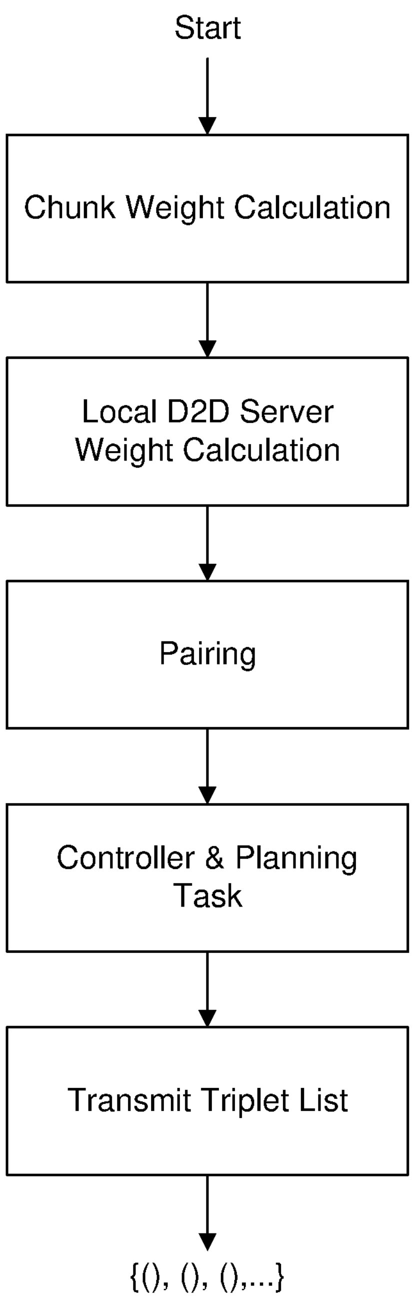
FIG. 13 illustrates a prediction algorithm, according to an embodiment.

FIG. 13 illustrates a prediction algorithm. The algorithm of FIG. 13 illustrates the different steps of the prediction, e.g. the weight calculation and the pairing. The last two steps, "Controller and Planning task" and "transmit triplet list" are described hereinafter.

13.1 Selection Criteria

The selection criteria may be the parameters used by the prediction algorithm to define which chunk the Client WTRU 102 (e.g. UE) may request to which Local D2D server.

There may be two criteria types, the first one may be related to the chunks and the second one to the Local D2D servers.

13.1.1 Chunk Criteria Type

At least any of three criteria may be taken into account to determine which chunks may be downloaded in priority, among all the available chunks, no matter the local D2D server:

Chunk scarcity.
Entry chunk.
Chunk order.

This criteria may aim at weighting all the chunks that the client WTRU 102 (e.g. UE) may be or will be able to download in its vicinity. It may be defined how often a chunk may be present/available for download.

The outcome of this may be to have a weight for each available chunks.

13.1.2 Local D2D Server Type

At least any of three criteria may be taken into account to determine the best local D2D servers:

Distance between the local D2D server and the client WTRU 102 (e.g. UE).
Speed and direction relative to client WTRU 102 (e.g. UE).
Throughput between the local D2D server and the client WTRU 102 (e.g. UE).

All these parameters may be given by the Network Monitoring and Analyzing Function.

The outcome of this may be to have a weight for each local D2D server.

13.2Chunk Scarcity

In a case where a chunk is available (e.g. only) on one device, it may be downloaded with a high priority. The less available it is, higher the weight.

FIG. 14 illustrates an example of weights calculation based on the chunk availability.

According to FIG. 14, the scarcity may be defined as the inverse of the availability of the chunks. The generated figures may be then normalized and finally a scale factor may be applied to get the sum value to 1. This last step corresponds to the weights.

FIG. 15 illustrates another example of weights calculation based on the chunk availability. Referring to FIG. 15, according to embodiments, we may consider the number of WTRUs 102 (e.g. UEs) having a chunk compared to the total number of WTRUs 102 (e.g. UEs) having at least one chunk of the model.

Referring to FIG. 15, we consider that 7 WTRUs 102 (e.g. UEs) may be engaged to collect the 6 chunks of the model.

Chunk 0 may be available to 4 of those 7 WTRUs 102 (e.g. UEs).

Chunk 1 may be only available to one WTRU 102 (e.g. UE), so it is the rarest chunk.

13.3 Entry Chunk

The entry chunk (or chunk ID 0) may be the most important one because it may be used alone and represents the basic AI/ML model to apply. It may deliver an inference result even if the other chunks may be not yet arrived. This may be not true for the other chunks that may use (e.g. require) all the previous chunks to be operational. For example the chunk ID 2 may use (e.g. require) the chunk ID 0 and 1 to be loaded first. For that reason chunk ID 0 may be privileged and downloaded in priority.

The way to generate the weights may be very straightforward, the entry chunk weight may be "1" and all the next chunk weights may be set to "0". Another possibility could be to set a value to entry chunk weight, then the next weight values may be a percentage of that basis. FIG. 16 illustrates an example of this proposal where the entry chunk weight may be set to 0.9 and the values of the other weights may be 10% of that values.

13.4Chunks Order

In a case where a model is split in several sub-model chunks as previously explained in FIG. 2A, the sub-model chunks may be identified and may have all a specific positioning. After their download, the chunks may be identified and placed in memory accordingly so that at the end the whole model may be reconstructed. FIG. 17 represents all the chunks of a model and the associated weights. The chunk ID 0 may have a higher weight, and the weight value may be decreasing for the following chunks. This reflects for example the fact that having the chunk ID 1 may be more important than having the last one.

13.5Distance Between Client WTRU 102 (e.g. UE) and Local D2D Servers

The distance parameter between the Client WTRU 102 (e.g. UE) and the Local D2D servers may be important in a proximity communication. The shortest distance may be privileged, and a higher weight may be applied to the corresponding Local D2D server.

A proposal of weights calculation from the available distance is illustrated in FIG. 18.

According to FIG. 18, the distance parameter may be the distance measured by the network (e.g. 5G/6G) system, for example, collected by the Network Monitoring and Analyzing Function. It may measure with a very high accuracy the WTRU 102 (e.g. UE) positioning within a cell, and it may deduce the distance between the proximity WTRUs 102 (e.g. UEs).

Figure 19:
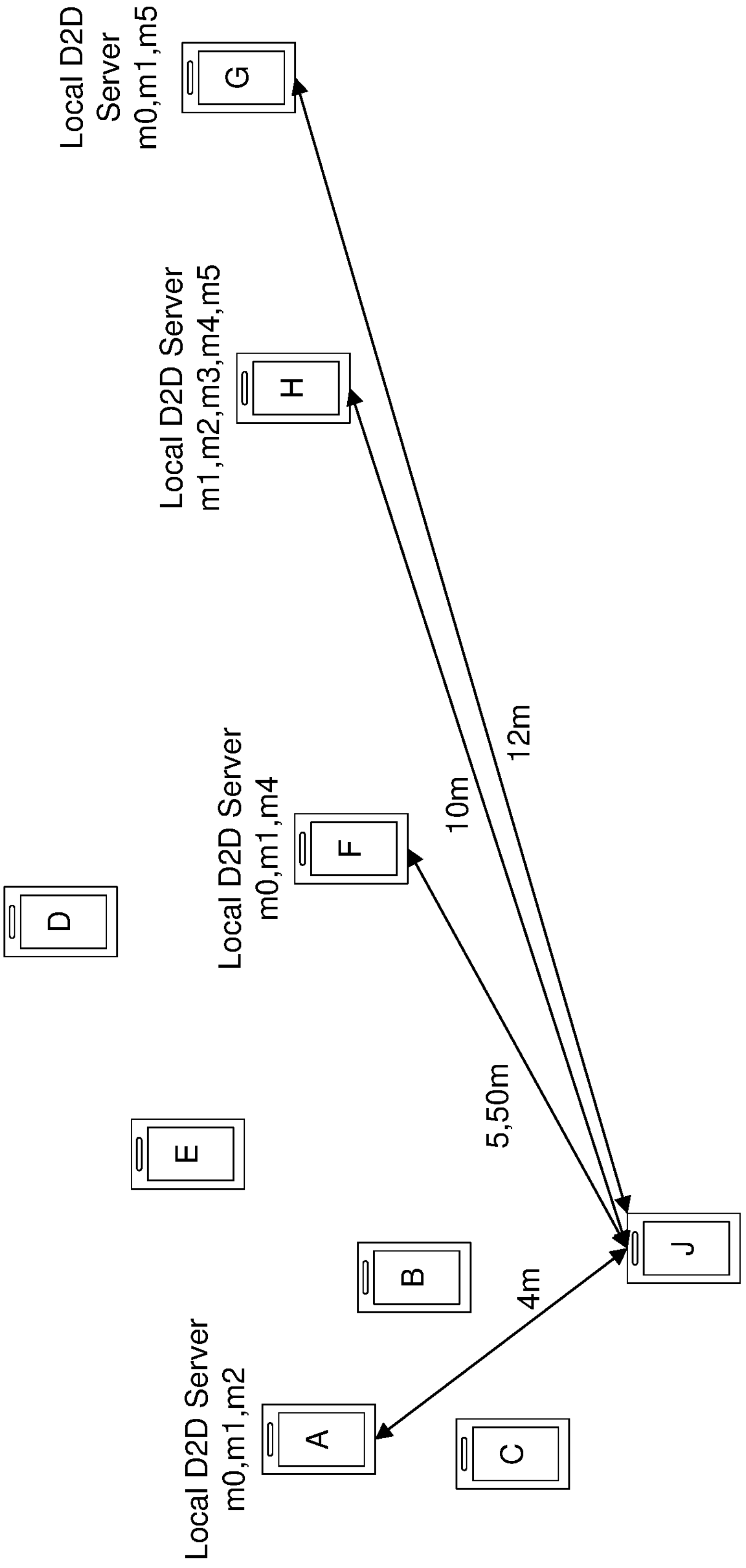
FIG. 19 illustrates an example of the distances between a client WTRU (e.g. UE) and the local D2D servers.

FIG. 19 illustrates the distances between the client WTRU 102 (e.g. UE) and the local D2D servers. According to FIG. 19, the client WTRU 102 (e.g. UE) may be almost as close to UE_A and UE_F but still far from UE_H and UE_G, that is why a small weight may be applied to them. The Local D2D Server UE_G may be taken into account by the D2D Supervisor although may be not yet visible by the Client WTRU 102 (e.g. UE). Indeed, with the current position, direction and speed of the Client WTRU 102 (e.g. UE), the D2D Supervisor may calculate that UE_G may be visible in a short period of time by the Client WTRU 102 (e.g. UE) and it may then be able to perform a chunk download.

13.6 Throughput Between Client WTRU 102 (e.g. UE) and Local D2D Servers

The throughput parameter between the Client WTRU 102 (e.g. UE) and the Local D2D servers may be use (e.g., important) in a proximity communication. The highest throughput may be privileged, and a higher weight may be applied to the corresponding Local D2D server.

Figure 20:
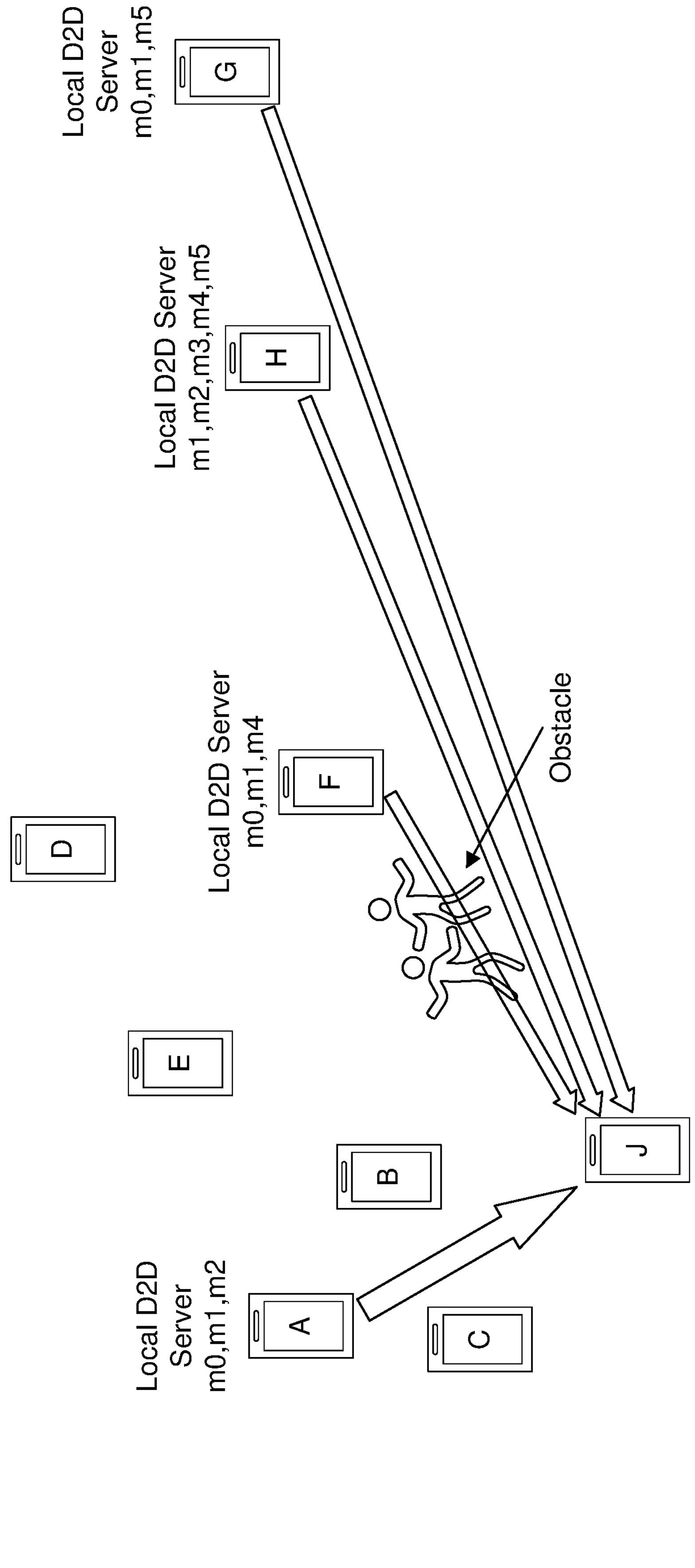
FIG. 20 illustrates an example of the throughput between a client WTRU (e.g. UE) and the local D2D servers.

FIG. 20 illustrates a scenario where the distances between the Client WTRU 102 (e.g. UE) and two Local D2D servers may be equivalent but the throughput may be less for one connection due to obstacles, for example dancing people.

The throughput between two proximity WTRUs 102 (e.g. UEs) may be defined in different ways:

It may be measured locally and transmitted to the Mobile Network Operator system.

It may be estimated/predicted by the Operator Network from the allocated radio resource.

It may be estimated/predicted by the Operator Network from the previous proximity transactions.

13.6.1 Weight Calculation Based on Throughput

A proposal of weights calculation from the available throughputs is illustrated in FIG. 21. The throughput figures reflect the example of FIG. 20.

13.6.2 Weight Calculation Based on Throughput

According to embodiments, no starting information on bitrate may be provided, the throughput may be not known by the Network Monitoring and Analyzing Function, therefore in a case where the process starts up the related weights may not (e.g. cannot) be calculated and may be neutral in the way to determine the Local D2D server.

After a few communication between devices, the table may be filled with values. In a case where all the bitrates are collected the weight calculation table may be used.

13.7 Weights Compilation

This section intends to propose different methods to compile the weights generated in function of the chunk criteria type and in function of the Local D2D server type. A final goal may be to know which chunk the Client WTRU 102 (e.g. UE) may download from which Local D2D server with the best efficiency. Efficiency may mean any of: no delay, no missing chunk, and best usage of the available throughput.

13.7.1 Manual Compilation

FIG. 22 illustrates an example of weights compilation based on chunk criteria type. According to FIG. 22, the chunk weights may be gathered per criteria type as they may be calculated, as described previously.

13.7.1.1 Weights Compilation from Chunk Criteria Type

To get the final chunk weight, a proposal may be to apply a weight factor for each chunk criteria. Indeed Mobile Network Operator or the third party that manages the D2D Supervisor may decide that the "chunk scarcity" criteria may be more important than the "entry chunk" criteria. The weight factors may be $\alpha$, $\beta$ and $\gamma$. "$\alpha$" may be applied on the "chunk scarcity" criteria. "$\beta$" may be applied on the "entry chunk" criteria. "$\gamma$ " may be applied on the "chunk ordering" criteria. It may be assumed that $\alpha$=0.4, $\beta$=0.4 and $\gamma$=0.2

Figure 23:
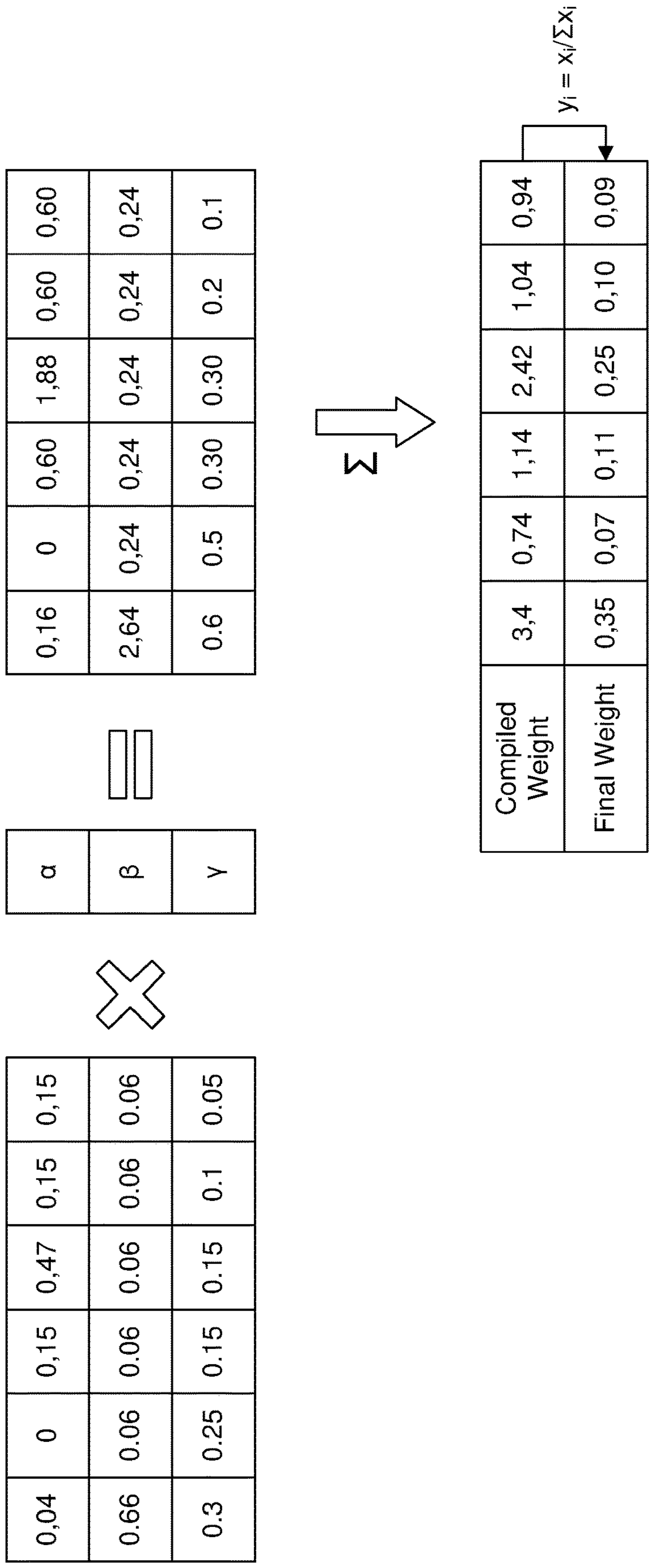
FIG. 23 illustrates an example of weights compilation based on chunk criteria type, according to an embodiment.

FIG. 23 illustrates an example of calculation method of weights compilation based on chunk criteria type Calculation method:

According to FIG. 23, the D2D Supervisor may privilege chunk m0, then chunk m3 followed by chunks m2, m4, m5 and finally m1.

13.7.1.2 Weight Compilation from the Local D2D Server Criteria Type

The next step may be to define what may be the best Local D2D server for the download. The same process, previously described, may be applied.

FIG. 24 illustrates an example of weights compilation based on local D2D server criteria.

Weight factors ($\alpha$ and $\beta$) may be applied depending on the Local D2D server criteria. E.g. $\alpha$ may be applied on the throughput criteria and $\beta$ may be applied on the distance criteria. By doing so, the entity (MNO or third party) that manages the D2D Supervisor may apply a different policy on throughput or distance. It may be assumed that $\alpha$=6 and $\beta$=4.

Figure 25:
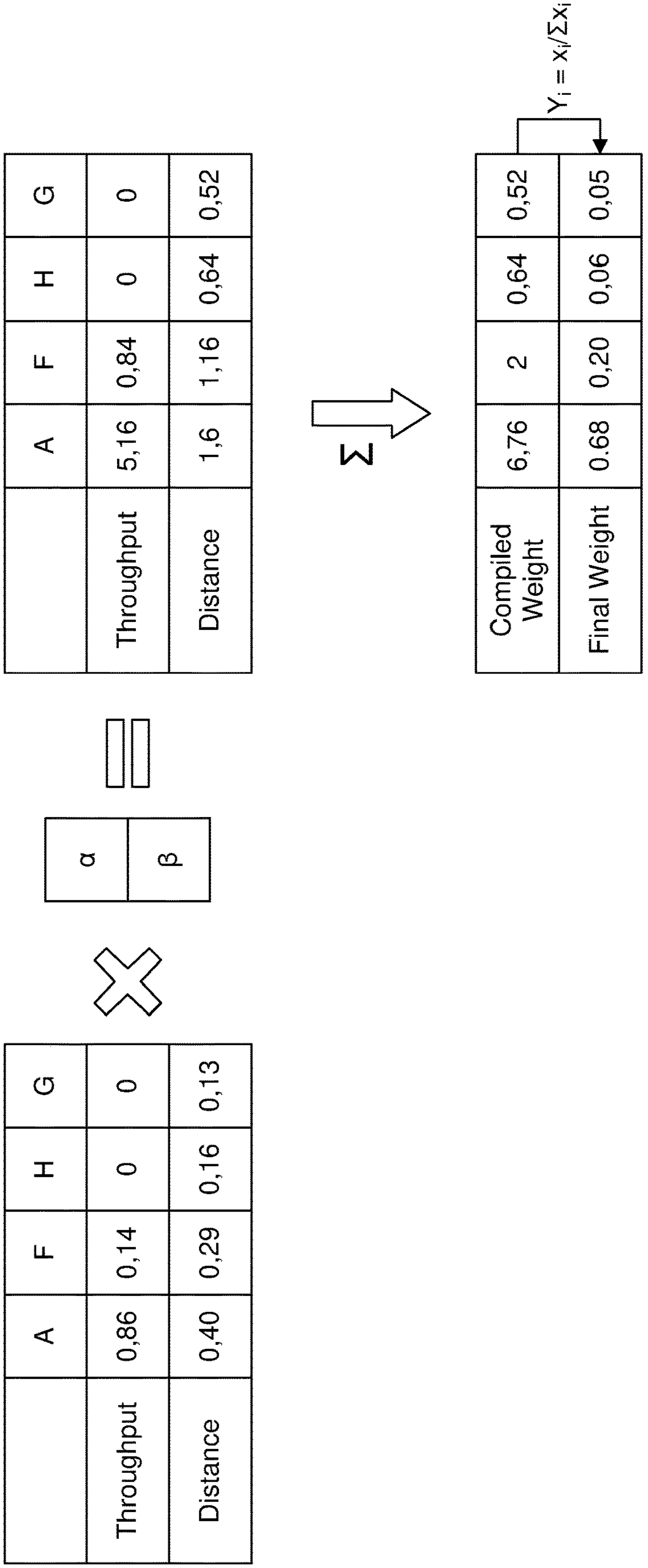
FIG. 25 illustrates an example of weights compilation based on local D2D server criteria, according to an embodiment.

FIG. 25 illustrates an example of weights compilation based on local D2D server criteria.

From the results in FIG. 25, the Client WTRU 102 (e.g. UE) may use the Local D2D server "UE_A" in priority, followed by "UE_F", "UE_H" and then UE_G.

13.7.1.3 Chunk Priority and Local D2D Server Priority Pairing

Two lists (or vectors) may have been generated, one lists the chunks to be downloaded in priority, the other one lists the Local D2D servers to be addressed in priority. The aim of this section is to pair both results lists and to associate a chunk to a Local D2D Server, e.g. (UE_A, chunk ID 0) means chunk ID 0 may be downloaded from Local D2D Server UE_A. The D2D Supervisor may deliver this result to the Client WTRU 102 (e.g. UE).

The presence of the chunk in each Local D2D server may be first defined. This may be an information know by the D2D Supervisor as shown in FIG. 8. A chunk presence is illustrated in FIG. 26.

Figure 27:
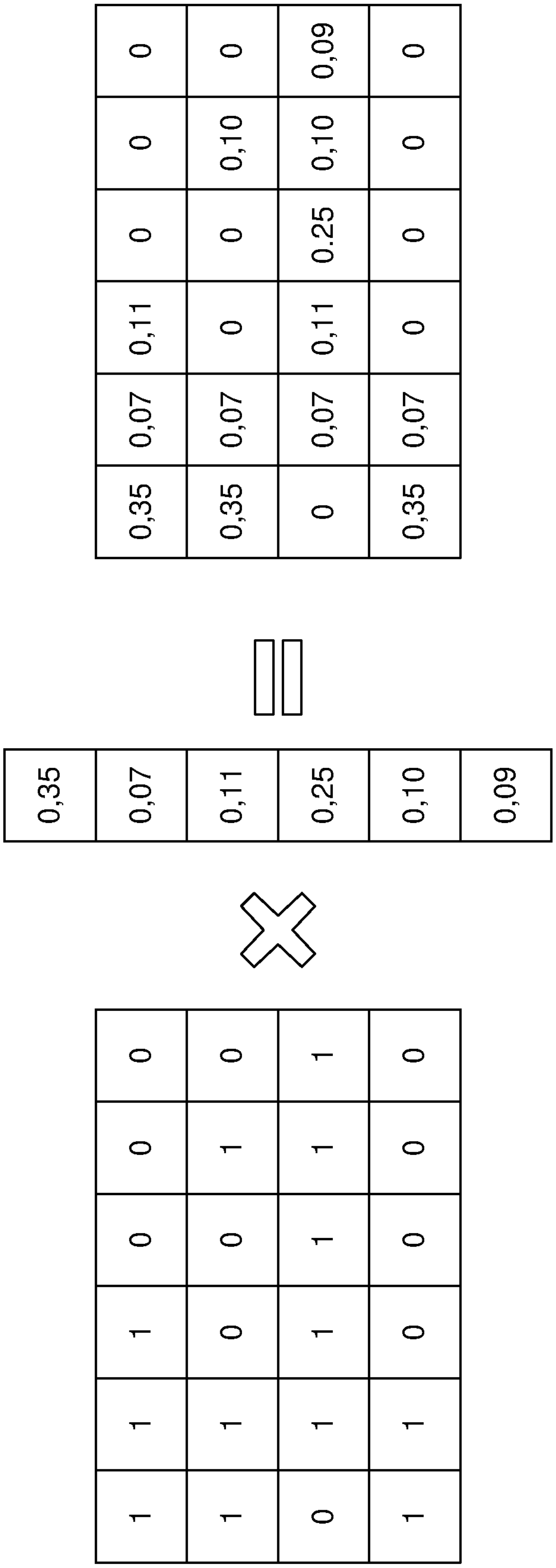
FIG. 27 illustrates an example of weights calculation based on a chunk presence matrix, according to an embodiment.

The chunk weight as calculated in FIG. 25, may be then applied in the chunk presence matrix, this is illustrated by FIG. 27.

The Local D2D server criteria may now be applied, this is illustrated in FIG. 28.

Figure 29:
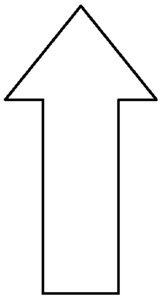
FIG. 29 illustrates an example of pairs extraction, according to an embodiment.

A final task may be to extract the best pairs, i.e. which chunk may be downloaded on which local D2D server. FIG. 29 illustrates that (e.g., final) process.

At this stage, the D2D Supervisor may have a pair candidate list and prior to transmit it to the Client WTRU 102 (e.g. UE) it may check whether the Client WTRU 102 (e.g. UE) may have not already the same list and if there may be no conflict with the other Client WTRUs 102 (e.g. UEs) that may be using the "D2D download service" and may be being downloaded chunks from Local D2D Servers.

14 Block 412: Detailed Controller and Planning Task 14.1 Scheduling

In addition to the pair (Local D2D server, chunk ID), a scheduling information may be added which may transmit a signal indicating to the Client WTRU 102 (e.g. UE) in a case where it starts downloading the chunk.

With this temporal information, the pair may become a triplet: (Local D2D server, chunk ID, scheduling).

The scheduling information may have different forms:

Time delay: how long may be the chunk download from the local WTRU 102 (e.g. UE) server.

A time range: from a starting time clock to an end time clock.

An expected applicability time: should start from that time clock.

A (e.g., each) download action from one WTRU 102 (e.g. UE) to the other may use (e.g. will require) a certain time that depends on the throughput. As described previously, the D2D Supervisor may get the current throughput between WTRUs 102 (e.g. UEs) or an estimate/prediction of this throughput. For example, based on this throughput value and on the chunk size, the D2D Supervisor may calculate an estimated time budget for the chunk download per WTRU 102 (e.g. UE).

For example, based on this timing information, the D2D Supervisor may estimate when the Client WTRU 102 (e.g. UE) could start each chunk download.

Figure 30:
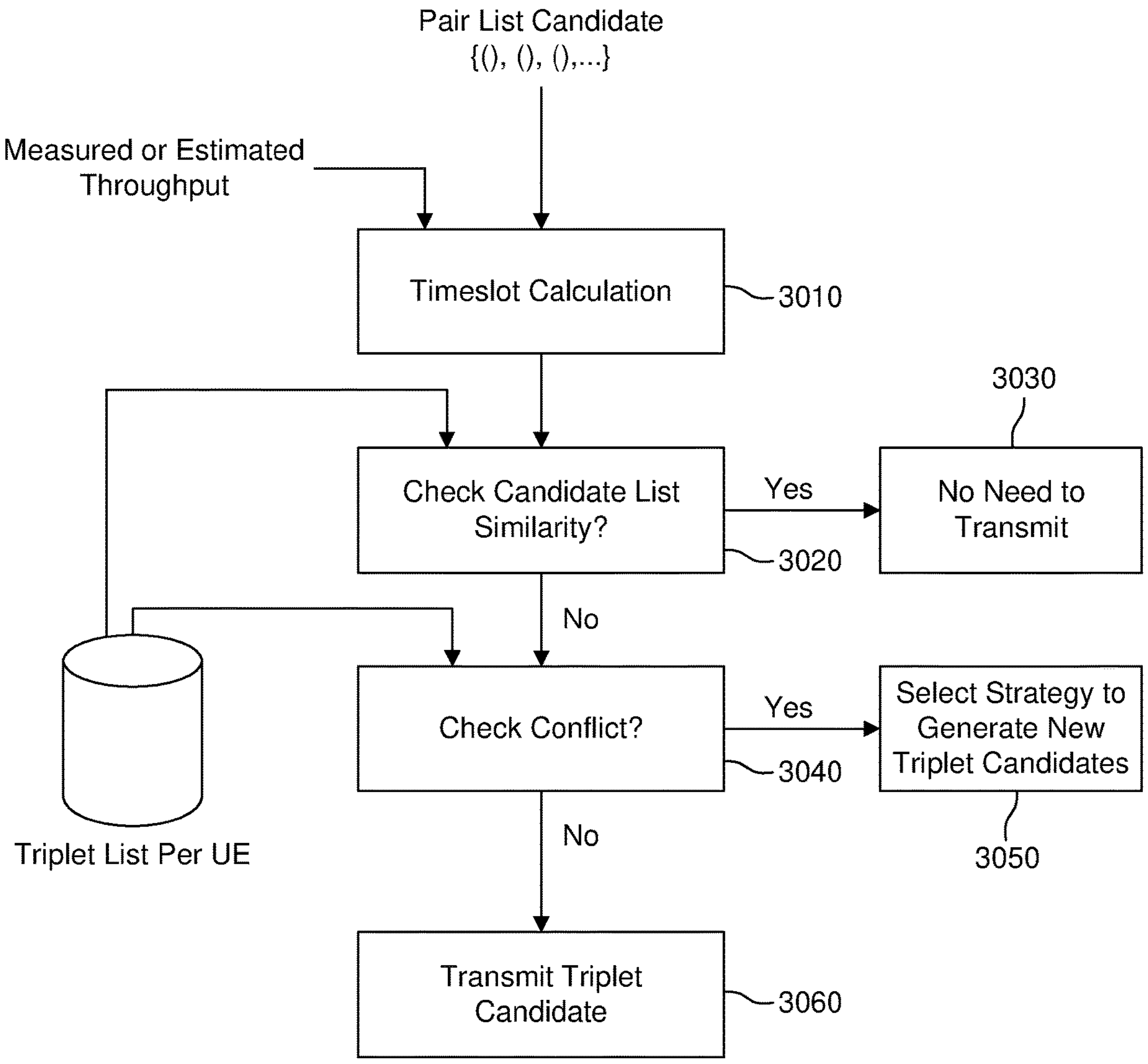
FIG. 30 illustrates a method to generate a triplet list, according to an embodiment.

FIG. 30 illustrates a method to generate a triplet list. According to FIG. 30, in a step 310, the controller and planning task may aim at first calculating a timeslot for each chunk download and/or (e.g., then) checking if the generated triplet list is not the same as the one already transmitted to the Client WTRU 102 (e.g. UE) and/or at detecting possible conflicts between the generated triplet list, which may be basically a download roadmap for the Client WTRU 102 (e.g. UE), and the triplet lists already provided to the other Client WTRUs 102 (e.g. UEs).

14.2Candidate List Similarity Check

In a step 3020, the D2D server may check from its "triplet list per UE" if there may be already an existing list for the current Client WTRU 102 (e.g. UE). If it is the case, (e.g., then) it may compare both the new generated one and the stored list. If there is no relevant difference or no difference at all then there may be no need to transmit this generated list (step 3030). At the opposite, the list may now be compared with the lists being used by other Client WTRUs 102 (e.g. UEs).

The terms "relevant difference" may mean that the D2D Supervisor may take into account only the pairs which may have a high scores.

14.3 Check Conflict

In a step 3040, a Local D2D server may serve (e.g., only) one Client WTRU 102 (e.g. UE) at a time. For example, two Client WTRUs 102 (e.g. UEs) may not (e.g. cannot) download a chunk from one unique Local D2D Server simultaneously.

All the weights may have been calculated for one Client WTRU 102 (e.g. UE) UE_J. Some other Client WTRUs 102 (e.g. UEs) in the close vicinity may request the same AI/ML Model and for the same reasons the AI/ML Model Server may not (e.g. cannot) handle their request. The D2D Supervisor may hand over the AI/ML Model download process. As shown in FIG. 3, the Client WTRU 102 (e.g. UE) UE_E may be one of these Client WTRUs 102 (e.g. UEs) that the D2D Supervisor may support.

The D2D Supervisor may run the same prediction algorithm for the Client WTRU 102 (e.g. UE) UE_E and it may turn out that the list of the best pairs looks like {(UE_F, chunk ID 0), (UE_A, chunk ID 2), (UE_A, chunk ID 1), (UE_F, chunk ID 4), (UE_H, chunk ID 3), (UE_G, chunk ID 5)}.

The timeslot for each pair may be calculated which may generate a triplet list that looks like {(UE_F, chunk ID 0, t1), (UE_A, chunk ID 2, t3), (UE_A, chunk ID 1, t5), (UE_F, chunk ID 4, t7), (UE_H, chunk ID 3, t9), (UE_G, chunk ID 5, t11)}.

Figure 31:
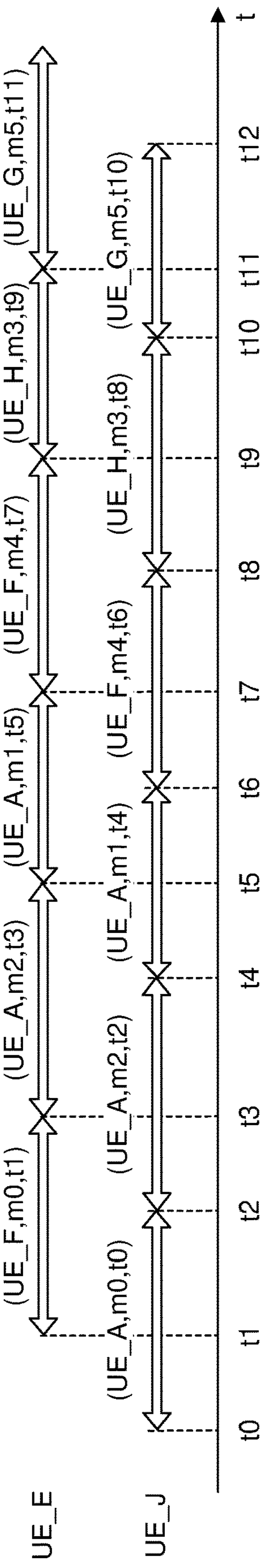
FIG. 31 illustrates a D2D download timeline, according to an embodiment.

The D2D Supervisor may check whether there may be conflicts between the possible UE_E download process and the UE_J download process that may have started some milliseconds or seconds before. This checking task is illustrated by the FIG. 31.

At t0, UE_J may start downloading the m0 chunk from Local D2D Server UE_A. A little bit later, at t1, UE_E may start downloading the m0 chunk from Local D2D Server UE_F. At t2, UE_J may have finished the m0 download and may start the m2 chunk download from the same Local D2D Server UE_A. At t3, UE_E may have finished downloading m0 and according to the original prediction UE_E should download the chunk m2 from the Local D2D Server UE_A. The D2D Supervisor may detect a possible conflict: two Client WTRUs 102 (e.g. UEs) may not (e.g. cannot) download chunks from the same Local D2D Server at the same time.

The triplet list as it is may not (e.g. cannot) be transmitted to the Client WTRU 102 (e.g. UE) UE_E. To palliate this issue, in a step 3050, the D2D Supervisor may have any of the following strategies:

The list transmitted (step 3060) to the Client WTRU 102 (e.g. UE) may be limited to the triplets that do not conflict.

The list generated for UE_E may be reordered.

Some triplets of the list may be postponed.

In a case where a Client WTRU 102 (e.g. UE) has finished downloading a chunk, it may transmit a notification to the D2D Supervisor. The D2D Supervisor may use this notification to check if the Local D2D Server may be free for a download request.

The prediction algorithm may be run again with different weight factors $\alpha$ and $\beta$ applied to throughput and distance criteria.

14.4Truncated List Transmission

Figure 32:
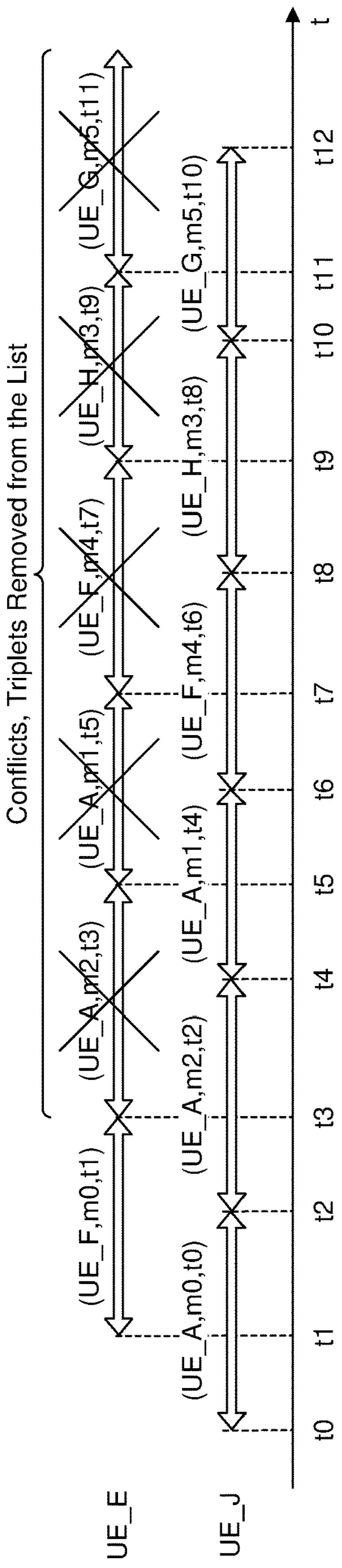
FIG. 32 illustrates removing of triplets from a triplet list, according to an embodiment.

The D2D Supervisor may remove from the list all the triplets that may be conflicting with the download roadmap transmitted previously to other Client WTRUs 102 (e.g. UEs). FIG. 32 illustrates this strategy.

The D2D Supervisor may transmit the list {(UE_F, m0, t1)} to the Client WTRU 102 (e.g. UE) UE_E.

14.5 List Reordering

Figure 33:
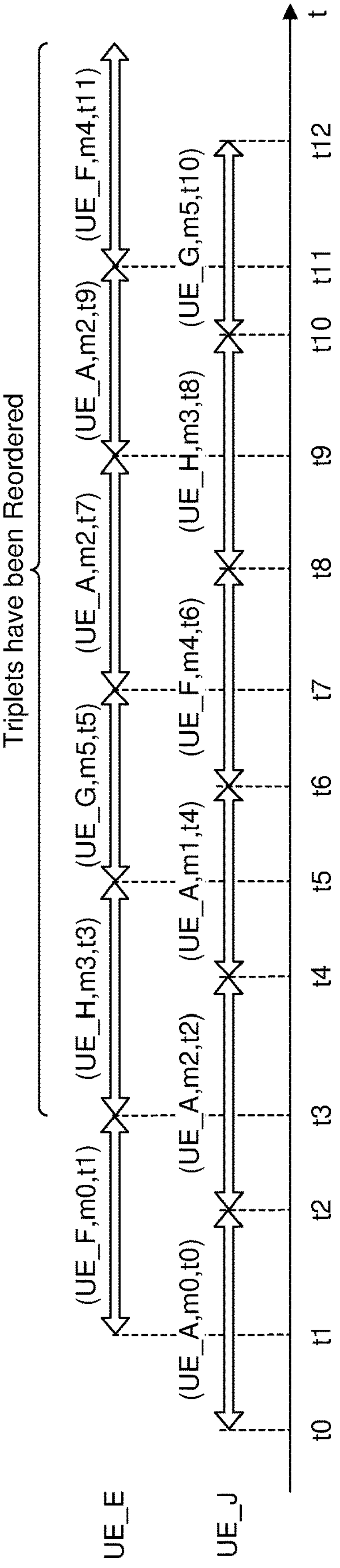
FIG. 33 illustrates an example of reordering triplets from a triplet list, according to an embodiment.

FIG. 33 illustrates an example of reordering triplets from a triplet list. According to FIG. 33, another strategy may be to reorder the part of the list where triplets may be conflicting with triplets already transmitted.

The D2D Supervisor may transmit the list {(UE_F, m0, t1), (UE_H, m3, t3), (UE_G, m5, t5), (UE_A, m2, t7), (UE_A, m1, t9), (UE_F, m4, t11)} to the Client WTRU 102 (e.g. UE) UE_E.

14.6Chunk Download Delayed

Figure 34:
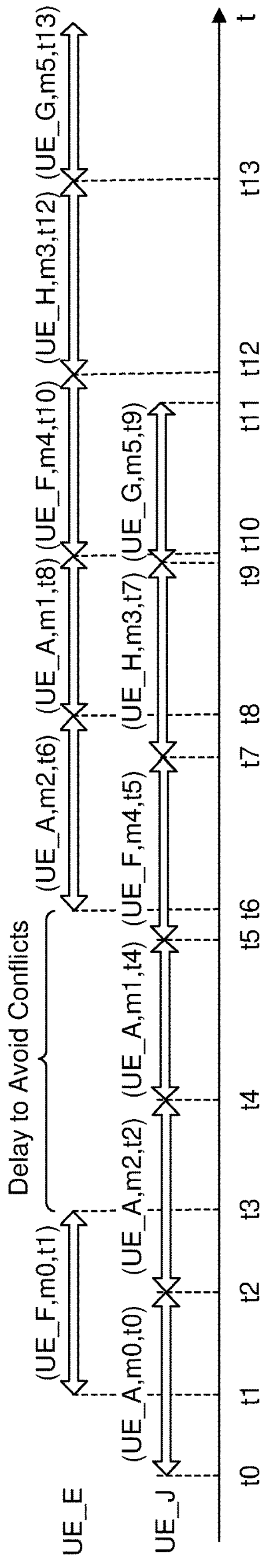
FIG. 34 illustrates an example of chunk download delayed, according to an embodiment.

The D2D Supervisor may postpone the download of some chunks by adding a delay to the timing information as illustrated in FIG. 34.

The D2D Supervisor may transmit the list {(UE_F, m0, t1), (UE_A, m2, t6), (UE_A, m1, t8), (UE_F, m4, t10), (UE_H, m3, t12), (UE_G, m5, t13)}.

14.7List Transmission on Notification

Figure 35:
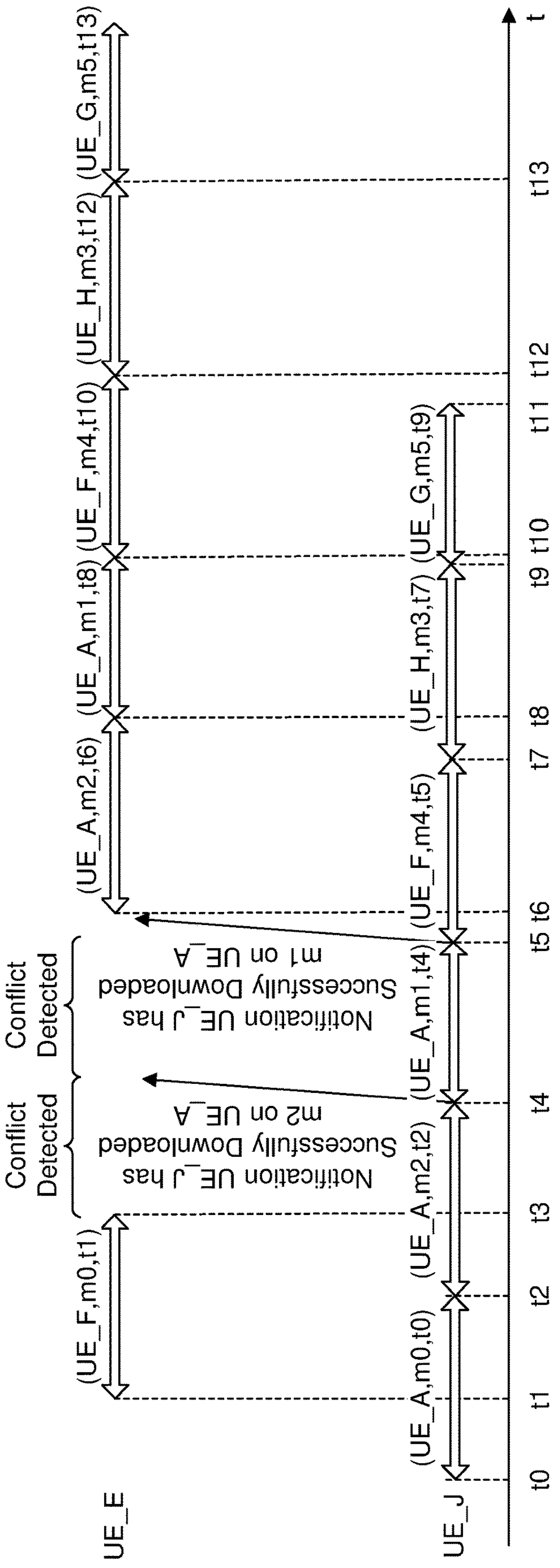
FIG. 35 illustrates an example of a list transmission on notification, according to an embodiment.

With this strategy, the D2D Supervisor may send a primary list that contains the triplets that do not conflict with triplet lists currently in use by other Client WTRUs 102 (e.g. UEs). In the example illustrated in FIG. 35, the D2D Supervisor may transmit the list {(UE_F, m0, t1)} to UE_E. In a case where it receives the second notification from the UE_J telling that the m1 chunk download from UE_A was successful, it may know that UE_A may be now free, and UE_E may hand over the download with UE_A. The D2D Supervisor may not detect any other conflict, in consequence it may transmit the rest of the list to UE_E.

14.8 Prediction Algorithm Re-Launched

Figure 36:
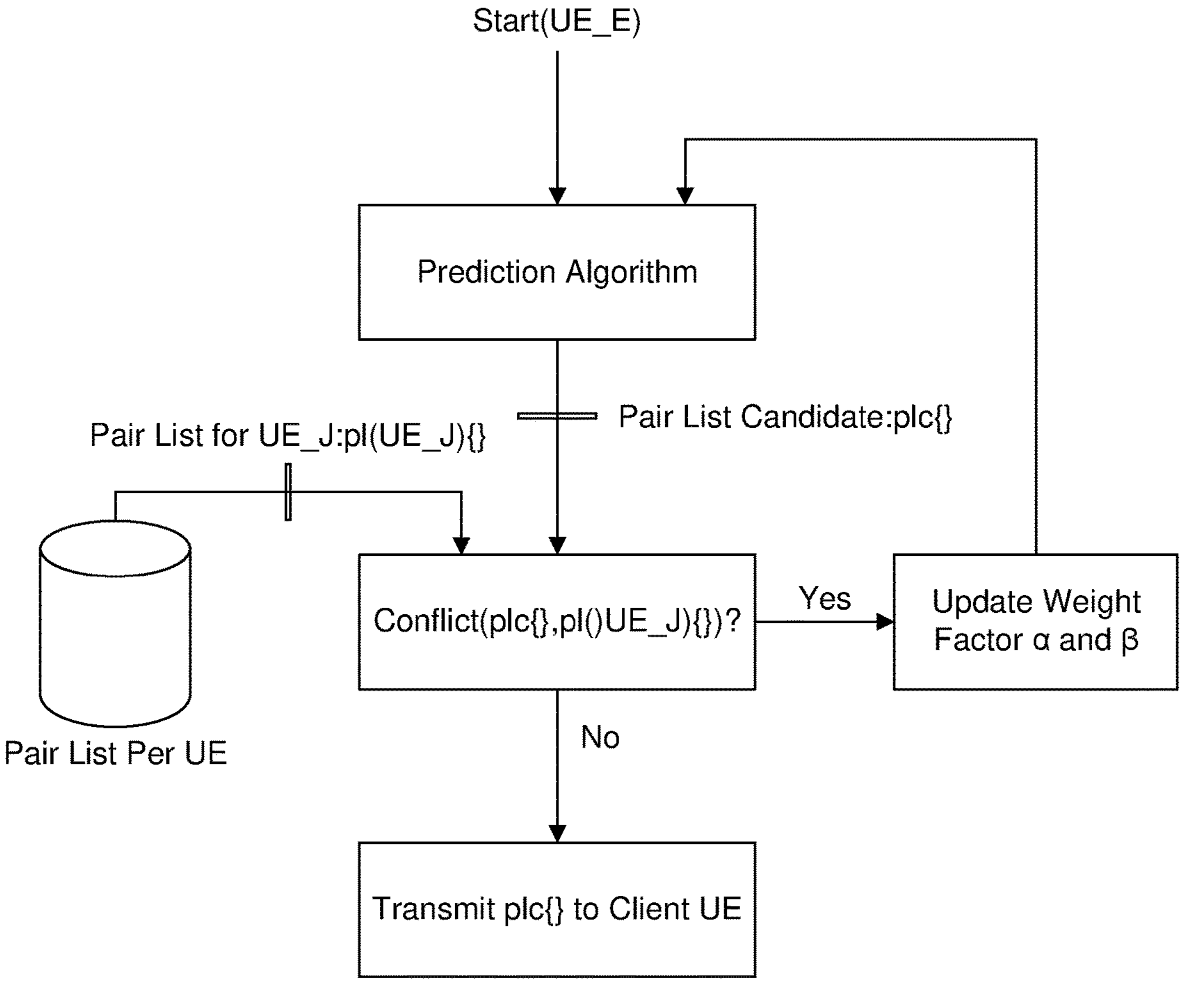
FIG. 36 illustrates a prediction algorithm with new weight factors, according to an embodiment.

FIG. 36 illustrates a prediction algorithm with new weight factors, according to an embodiment. According to FIG. 36, the D2D Supervisor may decide to set new values to weight factors α and β as previously defined and to relaunch the prediction algorithm. By applying a stronger weight to whether bandwidth and/or distance, the final result may differ enough so that there may be no conflict anymore.

According to embodiments, the D2D Supervisor may transmit a list of quad (Local D2D server, chunk ID, scheduling, score). The final score as defined in the matrix of FIG. 29 may be used to generate the final best pairs. But some scores may have a small value and the Client WTRU 102 (e.g. UE) may consider them as non-relevant: the communication with the Local D2D server may be problematic and/or the chunks may have less importance.

Figure 37:
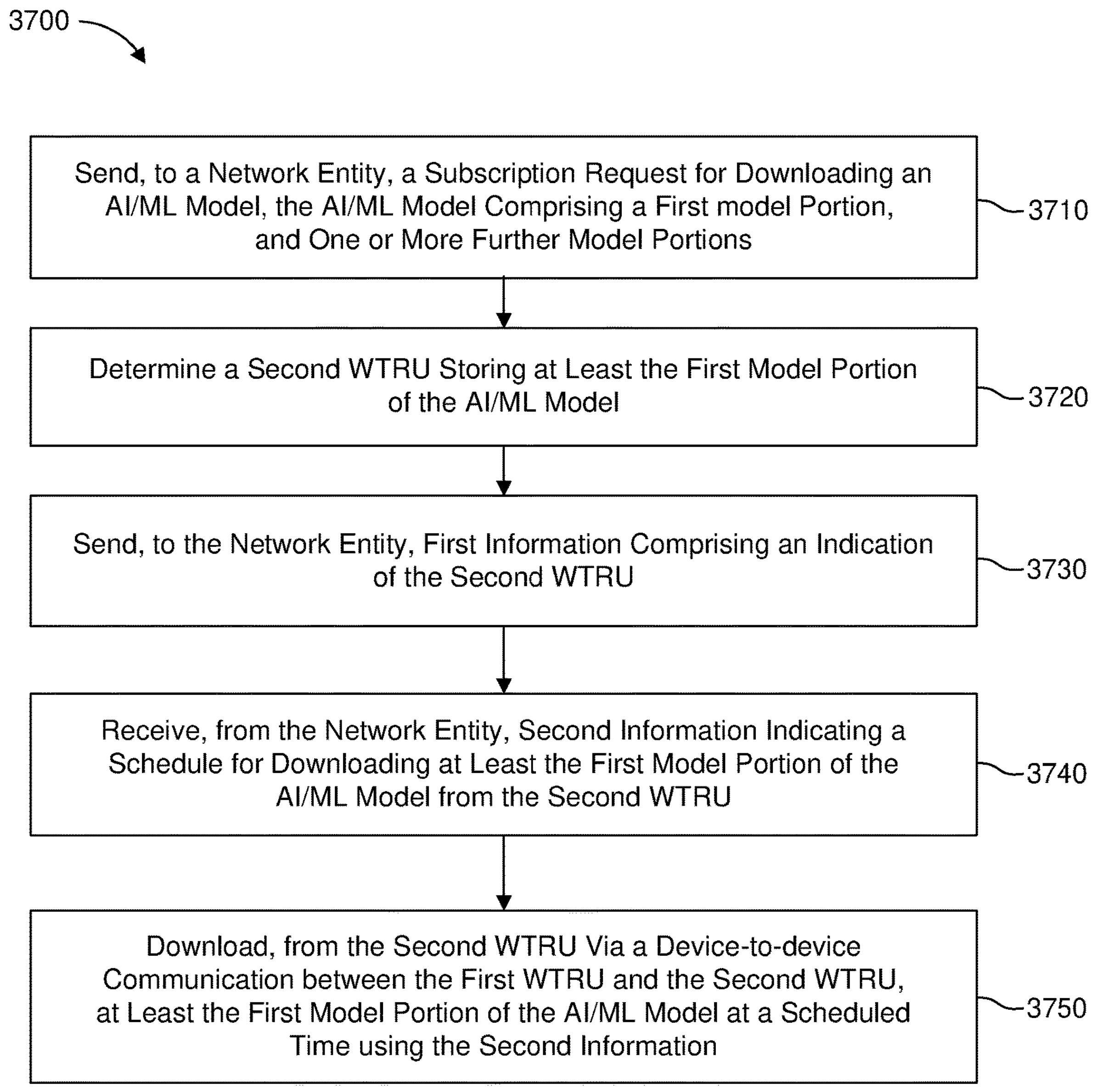
FIG. 37 is a flowchart illustrating a representative method implemented by a WTRU.

FIG. 37 is a flowchart illustrating a representative method implemented by a first WTRU 102.

Referring to FIG. 37, the representative method 3700 may include, at block 3710, sending, to a network entity, a subscription request for downloading an AI/ML model, the AI/ML model comprising a first model portion, and one or more further model portions. At block 3720, the WTRU may determine a second WTRU storing at least the first model portion of the AI/ML model. At block 3730, the WTRU may send, to the network entity, first information comprising an indication of the second WTRU. At block 3740, the WTRU may receive, from the network entity, second information indicating a schedule for downloading at least the first model portion of the AI/ML model from the second WTRU. At block 3750, the WTRU may download, from the second WTRU via a device-to-device communication between the first WTRU and the second WTRU, at least the first model portion of the AI/ML model at a scheduled time using the second information.

In certain representative embodiments, the representative method 3700 may further comprise sending, to the network entity, information indicating a successful download of at least the first model portion.

In certain representative embodiments, the first model portion may be a base AI/ML model of the AI/ML model, wherein the AI/ML model may have any of: (1) a greater accuracy than the base AI/ML model for a predetermined validation data set, (2) a greater number of floating point operations (FLOPs), (3) a greater memory size.

In certain representative embodiments, the second information may indicate a score associated with the first model portion of the AI/ML model, and/or the schedule for downloading at least the first model portion of the AI/ML model may be based on the score associated with the first model portion of the AI/ML model.

In certain representative embodiments, the score associated with the first model portion of the AI/ML model may be based on any of: (1) a model portion scarcity, (2) a model portion order, (3) a condition that a model portion corresponds to a base AI/ML model of the AI/ML model.

In certain representative embodiments, the score associated with the first model portion of the AI/ML model may be based on any of: a distance between the first WTRU and the second WTRU, and a throughput between the first WTRU and the second WTRU.

In certain representative embodiments, the representative method 3700 may further comprise sending, to the network entity, third information comprising any of: (1) a location of the first WTRU, (2) a speed of the first WTRU, (3) a direction of the first WTRU, (4) a throughput between the first WTRU and the second WTRU.

In certain representative embodiments, the second WTRU may comprise a local server storing at least the first model portion of the AI/ML model.

Figure 38:
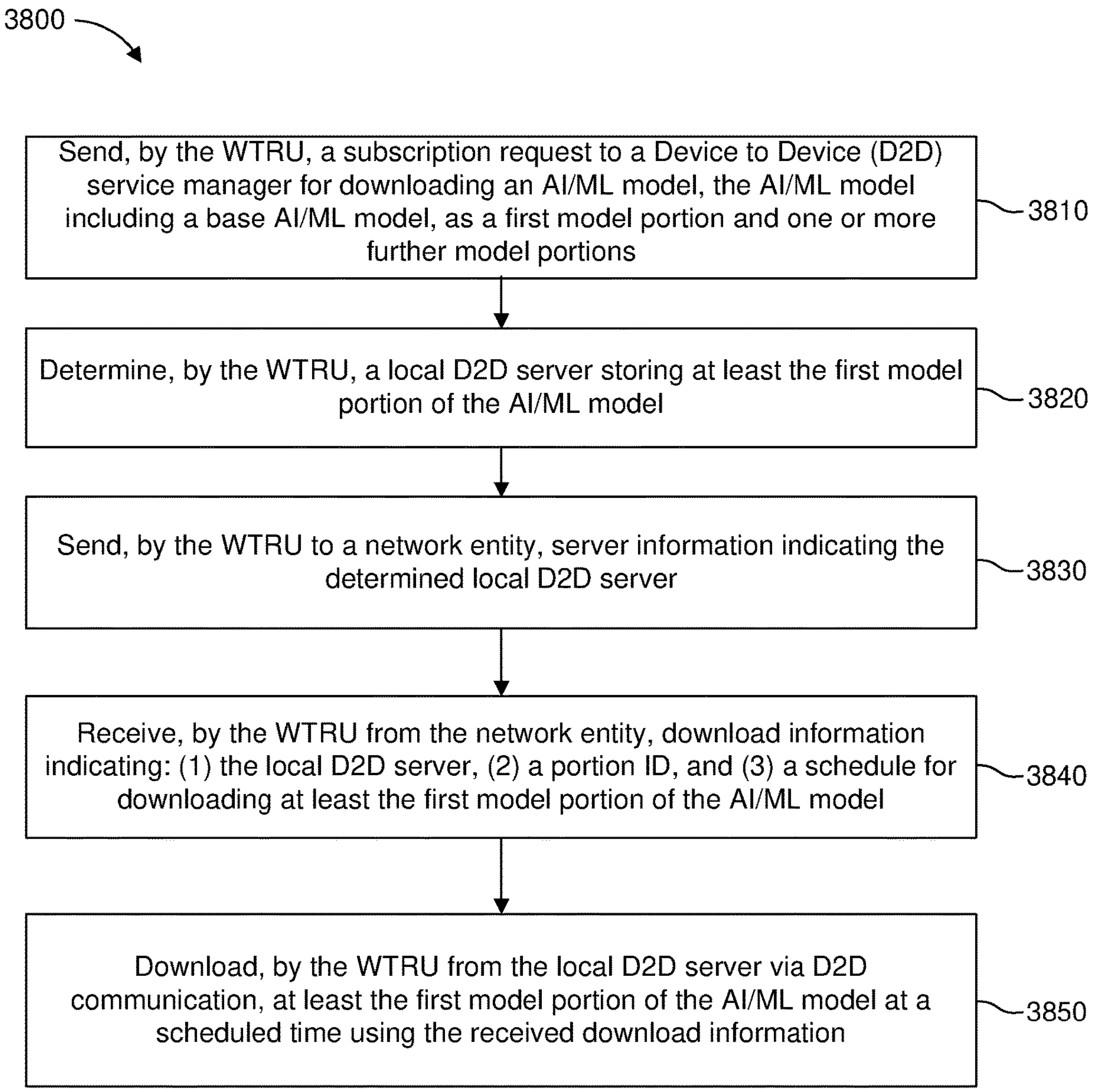
FIG. 38 is another flowchart illustrating a representative method implemented by a WTRU.

FIG. 38 is a flowchart illustrating a representative method implemented by a WTRU 102.

Referring to FIG. 38, the representative method 3800 may include, at block 3810, sending, by the WTRU, a subscription request to a D2D service manager for downloading an AI/ML model, the AI/ML model including a base AI/ML model, as a first model portion and one or more further model portions. At block 3820, the WTRU may determine a local D2D server storing at least the first model portion of the AI/ML model. At block 3830, the WTRU may send to a network entity, server information indicating the determined local D2D server. At block 3840, the WTRU may receive from the network entity, download information indicating: (1) the local D2D server, (2) a portion ID, and (3) a schedule for downloading at least the first model portion of the AI/ML model. At block 3850, the WTRU may download from the local D2D server via D2D communication, at least the first model portion of the AI/ML model at a scheduled time using the received download information.

In certain representative embodiments, the representative method 3800 may further comprise sending, by the WTRU to the network entity, information indicating a successful download, by the WTRU from the local D2D server, of at least the first model portion.

In certain representative embodiments, the first model portion may be a limited basic AI/ML model of the AI/ML model.

In certain representative embodiments, the download information further may indicate a score associated to the portion ID, and/or the schedule for downloading at least the first model portion of the AI/ML model may be based on the score associated to the portion ID.

In certain representative embodiments, the score associated to the portion ID may be based on any of: (1) model portion scarcity, (2) model portion order, (3) a condition that a model portion corresponds to a limited basic AI/ML model of the AI/ML model.

In certain representative embodiments, the score associated to the portion ID may be based on any of a: distance between the WTRU and the local D2D server, and/or throughput between the WTRU and the local D2D server.

In certain representative embodiments, the representative method 3800 may further comprise sending, by the WTRU to the network entity, information on any of a: (1) location of the WTRU, (2) speed of the WTRU, (3) direction of the WTRU, (4) throughput between the WTRU and the local D2D server.

Conclusion

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 16 or means-plus-function claim format, and any claim without the terms "means for" is not so intended.

What is claimed is:

1. A method implemented by a first wireless transmit/receive unit (WTRU), the method comprising:

sending, to a network entity, a subscription request for downloading an artificial intelligence/machine learning (AI/ML) model, wherein the AI/ML model comprises a first model portion, and one or more further model portions;

determining a second WTRU storing at least the first model portion of the AI/ML model;

sending, to the network entity, first information comprising an indication of the second WTRU;

receiving, from the network entity, second information indicating a schedule for downloading at least the first model portion of the AI/ML model from the second WTRU;

downloading, from the second WTRU via a device-to-device communication between the first WTRU and the second WTRU, at least the first model portion of the AI/ML model at a scheduled time using the second information, wherein the first model portion is a base AI/ML model of the AI/ML model; and generating inference results using the at least first model portion.

2. The method of claim 1, comprising:

sending, to the network entity, information indicating a successful download of at least the first model portion.

3. The method of claim 1, wherein the AI/ML model has any of: (1) a greater accuracy than the base AI/ML model for a predetermined validation data set, (2) a greater number of floating point operations, and (3) a greater memory size.

4. The method of claim 1, wherein the second information indicates a score associated with the first model portion of the AI/ML model, and wherein the schedule for downloading at least the first model portion of the AI/ML model is based on the score associated with the first model portion of the AI/ML model.

5. The method of claim 4, wherein the score associated with the first model portion of the AI/ML model is based on any of: (1) a model portion scarcity, (2) a model portion order, and (3) a condition that a model portion corresponds to a base AI/ML model of the AI/ML model.

6. The method of claim 4, wherein the score associated with the first model portion of the AI/ML model is based on any of: a distance between the first WTRU and the second WTRU, and a throughput between the first WTRU and the second WTRU.

7. The method of claim 1, comprising:

sending, to the network entity, third information comprising any of: (1) a location of the first WTRU, (2) a speed of the first WTRU, (3) a direction of the first WTRU, and (4) a throughput between the first WTRU and the second WTRU.

8. The method of claim 1, wherein the second WTRU comprises a local server storing at least the first model portion of the AI/ML model.

9. A first wireless transmit/receive unit (WTRU), the first WTRU comprising circuitry, including a transmitter, a receiver, a processor and a memory and being configured to:

send, to a network entity, a subscription request for downloading an AI/ML model, the AI/ML model comprising a first model portion, and one or more further model portions;

determine a second WTRU storing at least the first model portion of the AI/ML model;

send, to the network entity, first information comprising an indication of the second WTRU;

receive, from the network entity, second information indicating a schedule for downloading at least the first model portion of the AI/ML model from the second WTRU;

download, from the second WTRU via a device-to-device communication between the first WTRU and the second WTRU, at least the first model portion of the AI/ML model at a scheduled time using the second information, wherein the first model portion is a base AI/ML model of the AI/ML model; and generate inference results using the at least first model portion.

10. The first WTRU of claim 9, configured to:

send, to the network entity, information indicating a successful download of at least the first model portion.

11. The first WTRU of claim 9, wherein the AI/ML model has any of: (1) a greater accuracy than the base AI/ML model for a predetermined validation data set, (2) a greater number of floating point operations, and (3) a greater memory size.

12. The first WTRU of claim 9, wherein the second information indicates a score associated with the first model portion of the AI/ML model, and wherein the schedule for downloading at least the first model portion of the AI/ML model is based on the score associated with the first model portion of the AI/ML model.

13. The first WTRU of claim 12, wherein the score associated with the first model portion of the AI/ML model is based on any of: (1) a model portion scarcity, (2) a model portion order, and (3) a condition that a model portion corresponds to a base AI/ML model of the AI/ML model.

14. The first WTRU of claim 12, wherein the score associated with the first model portion of the AI/ML model is based on any of: a distance between the first WTRU and the second WTRU, and a throughput between the first WTRU and the second WTRU.

15. The first WTRU of claim 9, configured to:

send, to the network entity, third information comprising any of: (1) a location of the first WTRU, (2) a speed of the first WTRU, (3) a direction of the first WTRU, and (4) a throughput between the first WTRU and the second WTRU.

16. The first WTRU of claim 9, wherein the second WTRU comprises a local server storing at least the first model portion of the AI/ML model.

17. A non-transitory machine readable medium having stored thereon machine executable instructions that, when executed, implement the method according to claim 1.

18. The method of claim 1, wherein determining the second WTRU storing at least the first model portion of the AI/ML model comprises:

sending a discovery request to the second WTRU, wherein the second WTRU is in a vicinity of the first WTRU; and receiving, from the second WTRU, fourth information indicating that the second WTRU stores the first model portion.

19. The first WTRU of claim 9, wherein the first WTRU being configured to determine the second WTRU storing at least the first model portion of the AI/ML model, comprises the first WTRU being configured to:

send a discovery request to the second WTRU, wherein the second WTRU is in a vicinity of the first WTRU; and receive, from the second WTRU, fourth information indicating that the second WTRU stores the first model portion.

* * * * *